(12) United States Patent
Ryan et al.

(10) Patent No.: US 11,160,264 B2
(45) Date of Patent: *Nov. 2, 2021

(54) CARPENTER BEE TRAP

(71) Applicant: Best Bee Brothers LLC, Brookfield, WI (US)

(72) Inventors: Paul Patrick Ryan, Elm Grove, WI (US); Michael James Ryan, Wauwatosa, WI (US)

(73) Assignee: Best Bee Brothers, LLC, Milwaukee, WI (US)

(*) Notice: Subject to any disclaimer, the term of this patent is extended or adjusted under 35 U.S.C. 154(b) by 101 days.

This patent is subject to a terminal disclaimer.

(21) Appl. No.: 16/724,743

(22) Filed: Dec. 23, 2019

(65) Prior Publication Data

US 2020/0120915 A1 Apr. 23, 2020

Related U.S. Application Data

(63) Continuation-in-part of application No. 15/830,193, filed on Dec. 4, 2017, now Pat. No. 10,512,256.

(51) Int. Cl.
*A01M 1/10* (2006.01)
*A01M 1/02* (2006.01)

(52) U.S. Cl.
CPC ............ *A01M 1/106* (2013.01); *A01M 1/023* (2013.01); *A01M 2200/012* (2013.01)

(58) Field of Classification Search
CPC .......... A01M 1/10; A01M 1/106; A01M 1/20
See application file for complete search history.

(56) References Cited

U.S. PATENT DOCUMENTS

| 5,682,706 | A | 11/1997 | Altenburg |
| 6,766,611 | B2 | 7/2004 | Prince |
| 7,472,511 | B1 | 1/2009 | Ng |
| 8,375,624 | B2 | 2/2013 | Blazer |
| RE46,421 | E * | 6/2017 | Blazer ................ A01M 1/106 |
| 2010/0139151 | A1* | 6/2010 | Cwiklinski ............ A01M 1/02 43/107 |
| 2013/0298444 | A1* | 11/2013 | Strube .................... A01M 1/04 43/113 |

* cited by examiner

*Primary Examiner* — Richard G Davis
(74) *Attorney, Agent, or Firm* — Boyle Fredrickson, S.C.

(57) ABSTRACT

A carpenter bee trap includes a plurality of walls surrounding a trap cavity, at least one entrance opening formed through at least one of the plurality of walls, a bottom wall coupled to a bottom of the plurality of walls, an exit opening formed through one of the walls or the bottom wall, a container disposed within the trap cavity and extending through the exit opening and into the external environment, and a funnel disposed within the cavity to direct carpenter bees into the container.

20 Claims, 31 Drawing Sheets

CARPENTER BEE TRAP

CROSS-REFERENCE TO RELATED APPLICATIONS

This application claims priority to U.S. application Ser. No. 15/830,193, filed on Dec. 4, 2017, the entire contents of which are hereby expressly incorporated by reference in this application.

BACKGROUND OF THE INVENTION

1. Field of the Invention

The present invention relates to a carpenter bee traps, and more specifically to carpenter bee traps having containers suspended from the inside of the trap and having a release door on the container.

2. Discussion of the Related Art

Carpenter bees tend to bore into wood structures for nesting. Over time, carpenter bees may continue to bore new tunnels deeper into the wood structure. As a result of the boring described above, carpenter bees have a tendency to damage wooden structures to create their nests. The damaged wooden structures are then weakened and left defaced.

Carpenter bee traps have been used to entrap carpenter bees and leave them to die in a container of the trap. Such traps may be placed anywhere in or around a wooden structure, for example, but not limited to, the rafters and eaves of a wooden structure. By being made of wood or a wood substitute, the carpenter bee traps attract the carpenter bees. The carpenter bees are then able to enter the trap through openings mimicking boring tunnels. In some carpenter bee traps known in the art, a receptacle, such as a milk carton or soda bottle, is removable coupled to the bottom of the trap by way of a receptacle adapter. A user then needs to approach the carpenter bee trap to be able to remove the receptacle once filled with dead bees. In some instances, the user would need to climb a ladder to approach carpenter bee traps disposed in the rafters and eaves of a wooden structure.

As a result, there is a need in the art for a carpenter bee trap having a door disposed at on the trap container. The door would be able to be manipulated by a user from a closed position to an open position from a great distance. In turn, the door may also include a biasing element to maintain the door in the closed position when not being manipulated by the user. The door may also include perforations to allow airflow between the trap container and the external environment. The airflow would provide the scent and sound of carpenter bees to the external environment, which would act as a further attractant. Other benefits include moisture not being trapped inside trap container.

There also is a need for a carpenter bee trap to include a funnel feature in the trap cavity to direct the bees more efficiently to the trap container. Such a funnel would provide an additional measure to prevent bees from escaping the cavity of the trap.

SUMMARY OF THE INVENTION

A carpenter bee trap having a container suspended from the inside of the trap and a release door disposed at the bottom of the container.

In accordance with an embodiment of the invention, a carpenter bee trap includes a plurality of walls surrounding a trap cavity, at least one entrance opening formed through at least one of the plurality of walls, a bottom wall coupled to a bottom of the plurality of walls, an exit opening formed through one of the walls or the bottom wall, a container disposed within the trap cavity and extending through the exit opening and into the external environment, and a funnel disposed within the cavity to direct carpenter bees into the container.

According to another aspect of the invention, a door may be rotatably connected to the bottom of the container by way of a hinge. The door is operable between a closed position and an open position. Further, the hinge may include a biasing element to bias the door to a closed position. The door may also include a plurality of perforations to allow airflow between the container and an external environment.

According to yet another aspect of the invention, the container includes a main body and a flanged portion extending upward from a top of the main body at an angle between 0 and 90 degrees. The flanged portion has an increasing diameter as it extends from the top of the main body. Further, the flanged portion is disposed with the cavity and the main body is disposed within the exit opening and extends away from and beyond the bottom of the trap.

According to another aspect of the invention, the funnel extends from a top of the flanged portion to an opening aligned with the top of the main body.

According to yet another embodiment of the invention, the funnel may include flanges configured to push against an inner surface of at least one sidewall to suspend the funnel within the cavity.

In accordance with another embodiment of the invention, a carpenter bee trap includes a plurality of walls surrounding a trap cavity, at least one entrance opening formed through at least one of the plurality of walls, an exit opening formed at a bottom of the trap, and a container disposed within the trap cavity and transitionable between a retracted position and an extended position.

According to another aspect of the invention, the container is disposed within the trap cavity and extends into the exit opening when in the retracted position. Further, the container is disposed within the trap cavity and extends through the exit opening and beyond the bottom of the rap when in the extended position.

According to yet another aspect of the invention, the flanged portion extends from a top of a main portion of the container and is configured to push against an inner surface of at least one sidewall. The flanged portion acts to suspend the container within the cavity in one of the retracted position, the extended position, and any position therebetween. The flanged portion may include a funnel extending from a top of the flanged portion to an opening of the container.

According to another aspect of the invention, the container includes a bottom wall and at least one indentation formed in a surface of the bottom wall. The at least one indentation is configured to allow a user to position the container at a location between and including the retracted position and the extended position. In addition, the indentation is configured to allow a user to remove the container from the cavity. The bottom wall may also include a plurality of perforations formed therethrough to allow airflow between the container and an external environment.

In accordance with yet another embodiment of the invention, a carpenter bee trap includes a plurality of sidewalls surrounding a trap cavity, at least one entrance opening formed through at least one of the plurality of sidewalls, a bottom wall coupled to the bottom of the plurality of sidewalls, an exit opening formed through one of the sidewalls or the bottom wall, a funnel suspended within the trap cavity, the funnel separating the trap cavity into an upper trap cavity and a lower trap cavity, and a container disposed within the lower trap cavity and extending through the exit opening and away from the bottom wall of the carpenter bee trap.

According to another aspect of the invention, the container includes a main body, a flanged portion extending from a top of the main body, and a bottom wall coupled to a bottom of the main body. The flanged portion is disposed within the lower trap cavity, and the main body extends through the exit opening and beyond the bottom wall of the carpenter bee trap.

According to yet another aspect of the invention, the flanged portion has a first outer diameter and the main body has a second outer diameter. The first outer diameter is greater than the second outer diameter. The first outer diameter of the flanged portion is also greater than a diameter of the exit opening.

According to another aspect of the invention, the funnel includes at least one flange configured to push against an inner surface of at least one sidewall to suspend the funnel within the cavity.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications. Further, although many methods and materials similar or equivalent to those described herein may be used in the practice of the present invention, a few such suitable methods and materials are described in greater detail below.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
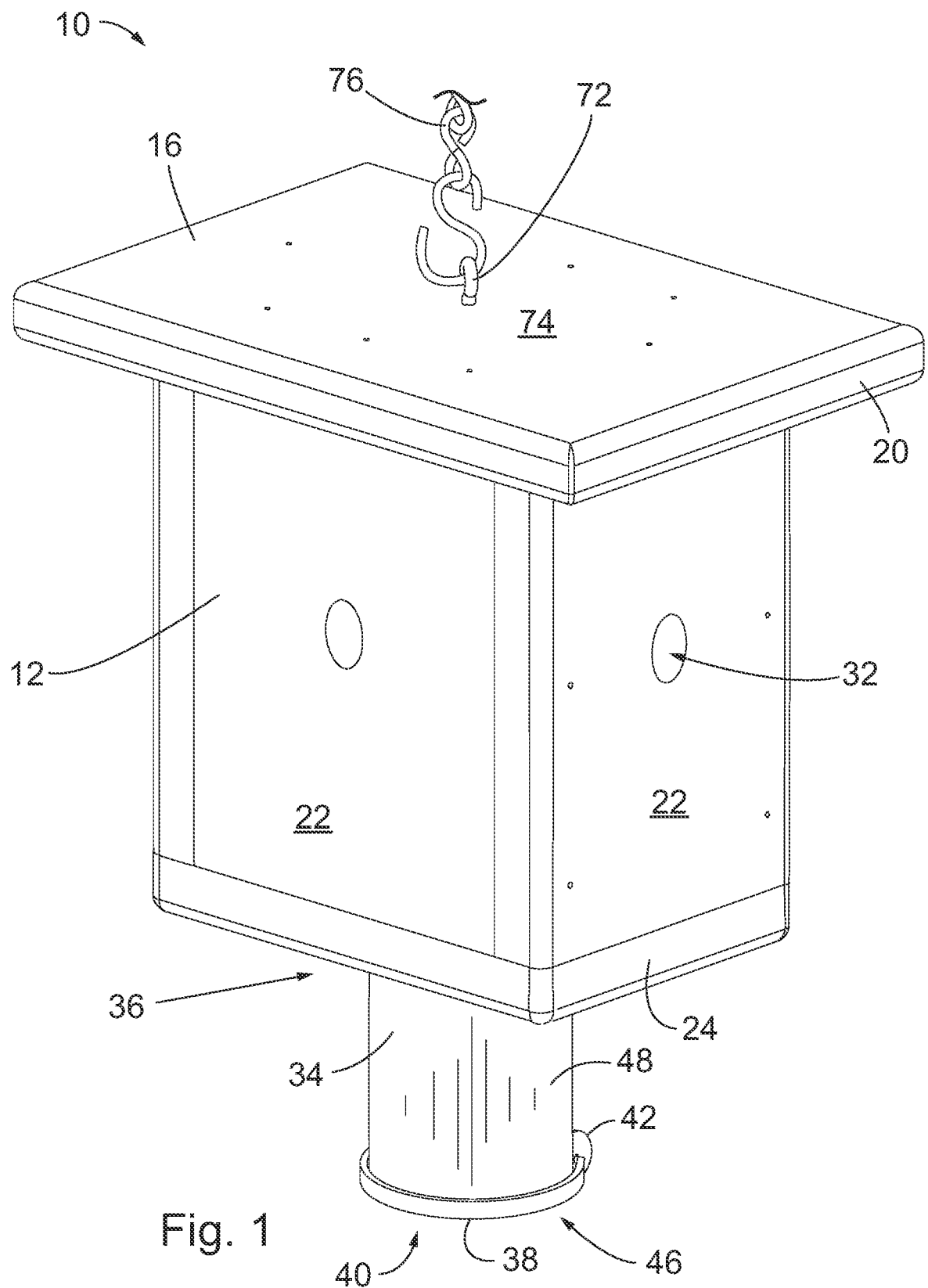
FIG. 1 is a perspective view of a carpenter bee trap, according to an embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF THE DRAWINGS

The present invention and the various features and advantageous details thereof are explained more fully with reference to the non-limiting embodiments described in detail in the following description.

Figure 2:
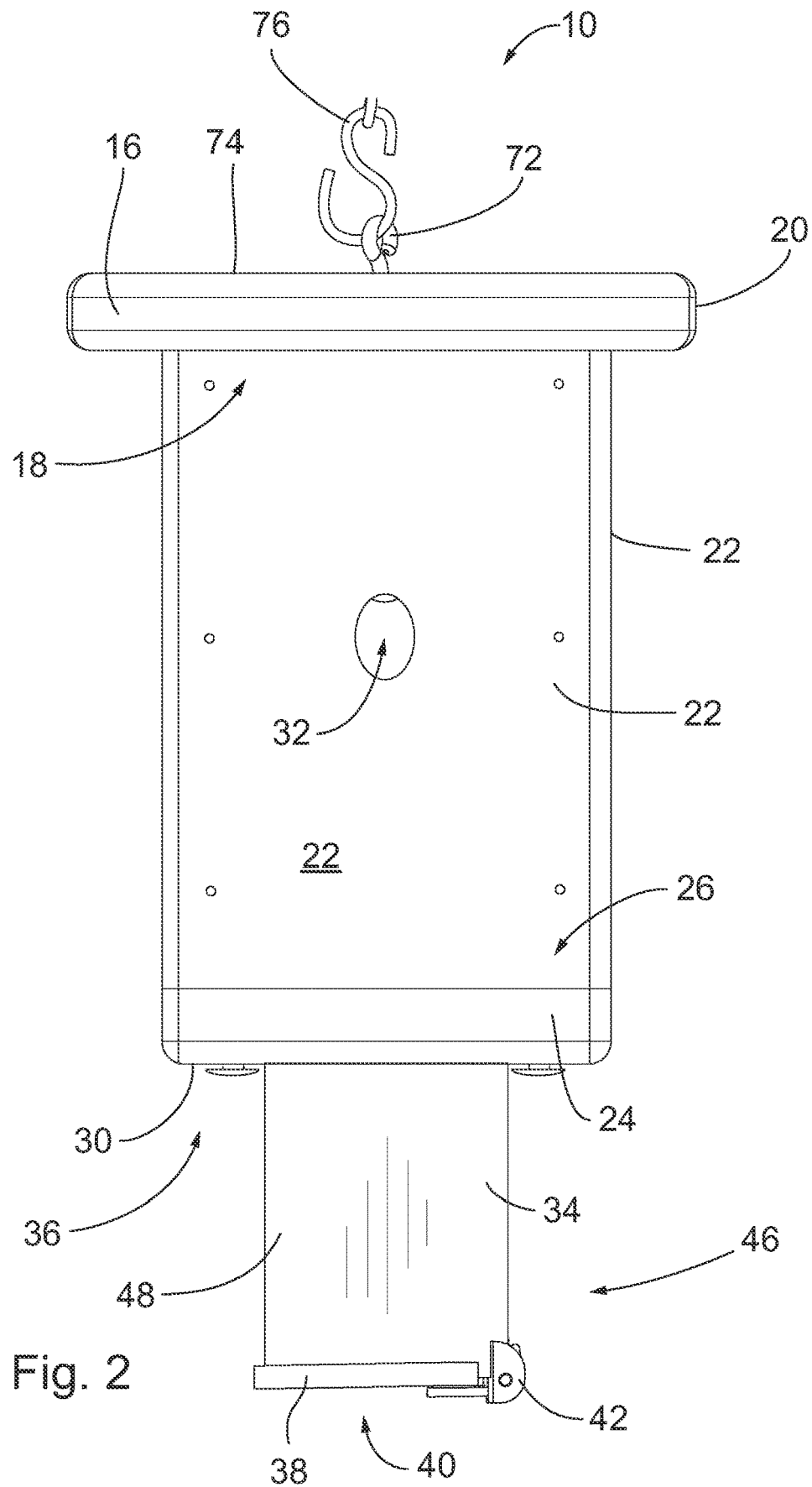
FIG. 2 is a side view of the carpenter bee trap of FIG. 1.
Figure 3:
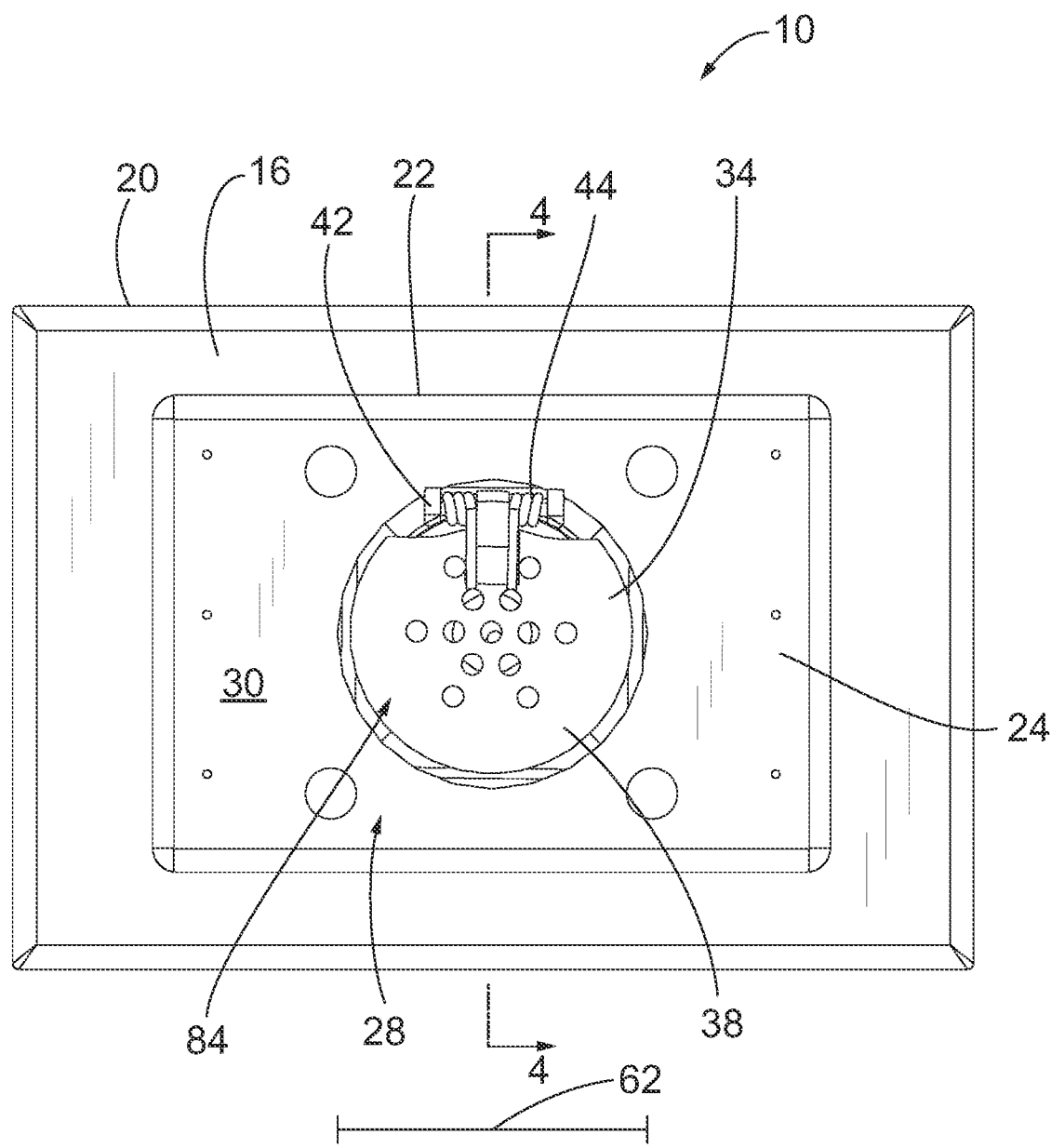
FIG. 3 is a bottom view of the carpenter bee trap of FIG. 1.

First referring to FIGS. 1-3, perspective, side, and bottom views, respectively, of a carpenter bee trap 10 are shown. The trap 10 includes a plurality of sidewalls 12 surrounding a trap cavity 14. While the representative embodiment of the invention illustrates the use of four (4) sidewalls 12, it is contemplated that other embodiments of the invention may include more or less than four (4) sidewalls. Further, while the trap 10 is illustrated as being rectangular in shape, different embodiments of the trap 10 may vary in shape.

The trap 10 further includes a top wall 16 attached to the top 18 of the plurality of walls 12, in order to further enclose the cavity 14. While FIG. 1 illustrates the edges 20 of the top wall 16 extending beyond the plurality of sidewalls 12, it is contemplated that the edges 20 of the top wall 16 may align with the outer surface 22 of the plurality of sidewalls 12, in alternative embodiments of the invention.

In this representative embodiment of the invention, the trap 10 also includes a bottom wall 24 coupled to the bottom 26 of the plurality of walls 12, in order to further enclose the cavity 14. As shown in FIG. 3, an opening 28 may be formed through the bottom wall 24 of the trap 10. While the opening 28 is illustrated as being centrally located on the bottom surface 30 of the bottom wall 24, it may be located at any location on the bottom surface 30 of the bottom wall 24. Opening 28 operates as an exit for the trap cavity 14.

At least one opening 32 is formed through at least one of the plurality of sidewalls 12 to act as an entrance to the trap 10. It is contemplated that the carpenter bees will enter the trap 10 through these openings 32. While FIG. 1 depicts an opening 32 in each sidewall 12, it is contemplated that any number of openings 32 may be formed through any number of sidewalls 12. For instance, each sidewall 12 may individually include any number of openings 32, including no openings 32. The configuration of the openings 32 will be further described below with respect to FIG. 4.

While FIG. 1 illustrates the sidewalls 14 as being oriented perpendicular to the top wall 16 and perpendicular to the bottom wall 24, it is contemplated that the sidewalls 14 may be oriented at varying angles.

A container 34 is disposed at the bottom 36 of the trap 10, so as to extend from within the cavity 14, through the opening 28, and out into the external environment. Once the bees enter the trap 10 through the openings 32 described above, the bees transition to the container 34 and become caught in the container 34, where they can collect. As shown in FIGS. 1 and 2, the container 34 includes a door 38 disposed at the bottom 40 of the container 34. The door 38 is rotatably coupled to the bottom 40 of the container 34 by way of a hinge 42. In the representative embodiment of the invention, the hinge 42 includes a biasing element 44 that maintains the door 38 in a closed position 46, as shown in FIGS. 1 and 2. In turn, a user may manipulate the door 38 from the closed position 46 to an open position (not shown). In the closed position 46 shown in FIGS. 1 and 2, the bees may collect within the container 34, as mentioned above. In the open position, the bees may be emptied from the container 34 at a moment determined by the user. In embodiments of the invention including the biasing element 44, the door 38 automatically transitions from the open position to the closed position 46 when the user releases the door 38.

In other embodiments of the invention, the hinge 42 may not include a biasing element 44. In these embodiments of the invention, a retaining device, such as, but not limited to a clip, may be used to retain the door 38 in the closed position 46. That is, a user would be able to release the door 38 from the retaining device, open the door 38 to empty the trap 10, close the door 38, and retain the door 38 in the closed position 46 by way of the retaining device.

Figure 4:
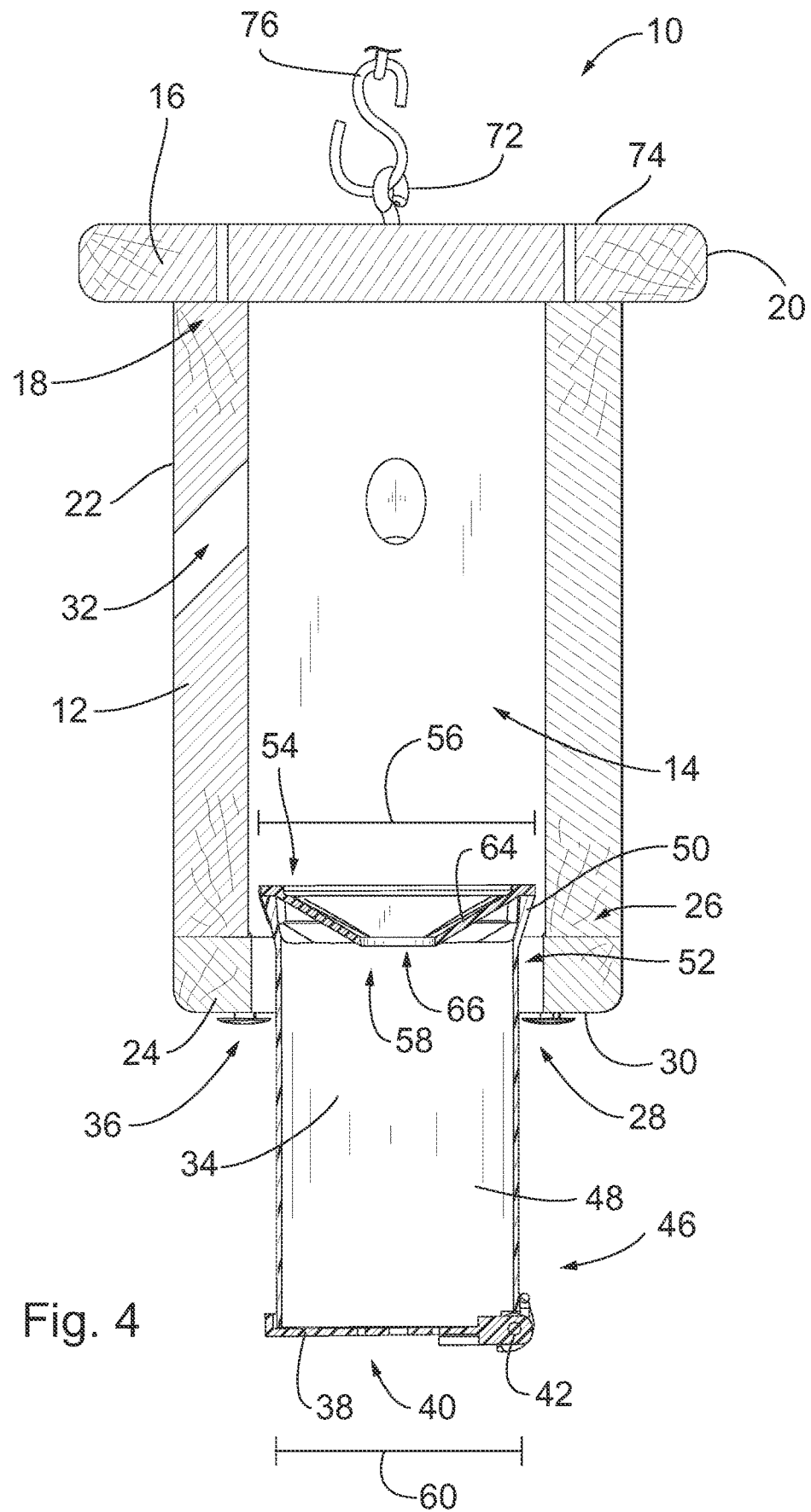
FIG. 4 is a cross-sectional view of the carpenter bee trap of FIG. 3, taken along line 4-4.

Next, FIG. 4 illustrates a cross-sectional view of the trap 10 in order to further illustrate the cavity 14 of the trap and the container 34 extending from within the cavity 14, through the opening 28, and out into the external environment. In the representative embodiment of the invention, the container 34 includes a main body 48 that is cylindrical in shape. In varying embodiments of the invention, the main body 48 of the container 34 may be any other shape. It is the main body 48 of the container 34 that extends through the opening 28 and into the external environment. The container 34 also includes a flanged portion 50 extending from the top 52 of the main body 48 of the container 34.

The flanged portion 50 extends from the top 52 of the main body 48 at an angle between 0 and 90 degrees so that the top 54 of the flanged portion 50 has a diameter 56, while the bottom 58 of the flanged portion 50 has a diameter 60. As shown in the representative embodiment of the invention, the diameter 56 of the top 54 of the flanged portion 50 is greater than the diameter 60 of the bottom 58 of the flanged portion 50.

In addition, the diameter 56 of the top 54 of the flanged portion 50 is greater than a diameter 62 of the opening 28 formed in the bottom wall 24 of the trap 10. As a result, of the increasing diameter from the bottom 58 to the top 54 of the flanged portion 50, the flanged portion 50 of the container 34 is maintained within the cavity 14 of the trap 10. In addition, the container 34 is suspended in its position of having the flanged portion 50 disposed within the cavity 14 and the main body 48 extending through the opening 28 of the bottom wall 24 of the trap 10 and beyond the bottom wall 24 of the trap 10, into the external environment.

The container 34 also includes a funnel 64 to direct the carpenter bees to the main body 48 of the container 34. The funnel 64 extends from the top 54 of the flanged portion 50 to a container opening 66 aligned with the bottom 58 of the flanged portion 50 and the top 52 of the main body 48. In the representative embodiment of the invention, the funnel 64 extends from the top 54 of the flanged portion 50 at an angle between 0 and 90 degrees so as to properly direct the bees to the main body 48 of the container 34.

FIG. 4 also illustrates the configuration of openings 32 in the sidewalls 12. For example, the openings 32 in the sidewalls 12 are oriented at an upward angle, which assists in preventing the bees from escaping the trap cavity 14. In other embodiments of the invention, the openings 32 may be oriented at any angle, including horizontally, upward, or downward.

Referring again to FIGS. 1 and 2, a mounting element 72 is shown disposed on a top surface 74 of the top wall 16. In the representative embodiment of the invention, the mounting element 72 is a mounting hook screwed into the top wall 16 of the trap 10. In other embodiments of the invention, the mounting element 72 may be other mounting means coupled to the top wall 16 of the trap 10. A chain or rope 76 is then coupled to the mounting element 72 in order to suspend the trap 10 from a mounting location, such as, but not limited to, a rafter.

Figure 5:
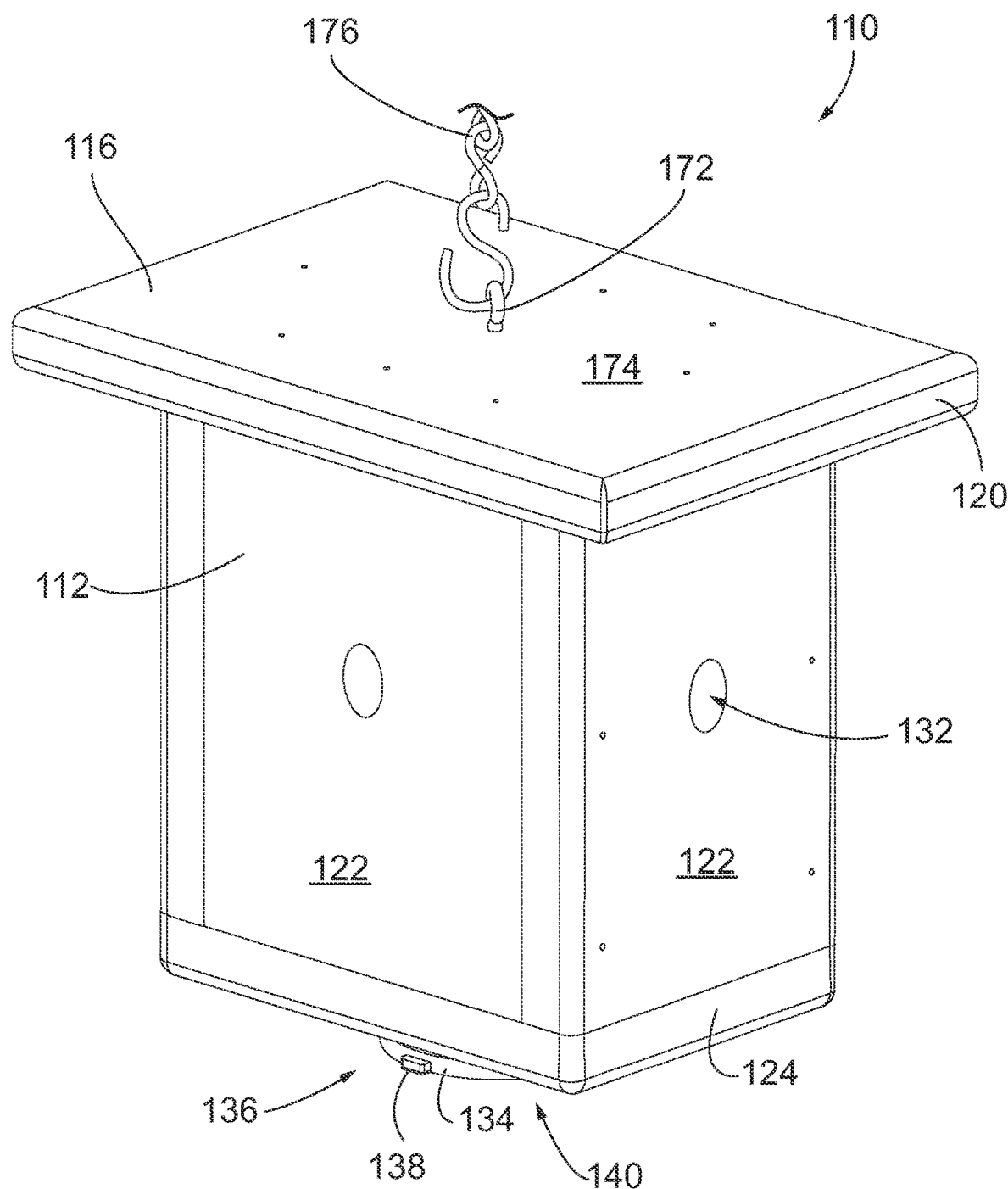
FIG. 5 is a perspective view of a carpenter bee trap, according to another embodiment of the invention.
Figure 6:
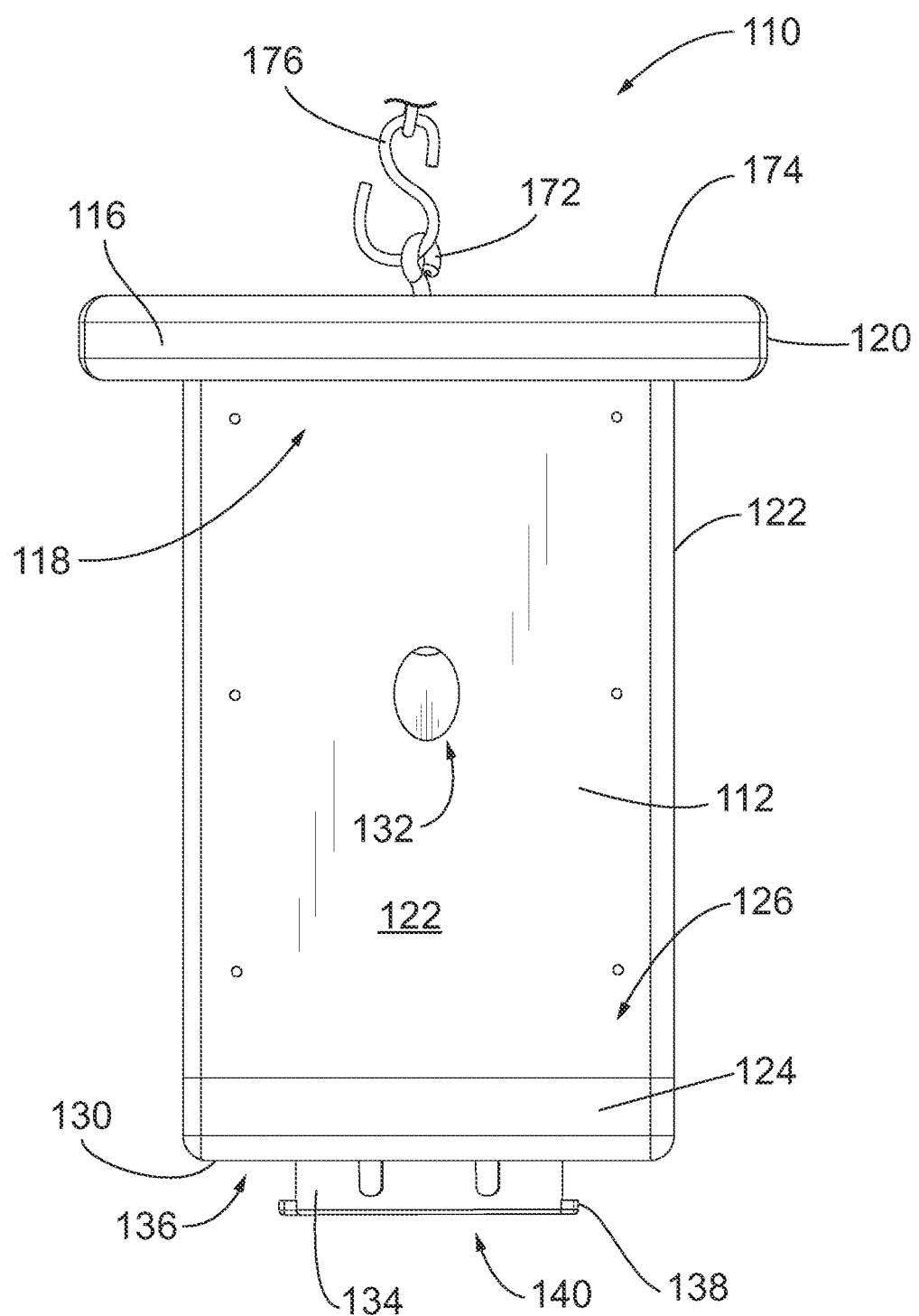
FIG. 6 is a side view of the carpenter bee trap of FIG. 5.
Figure 7:
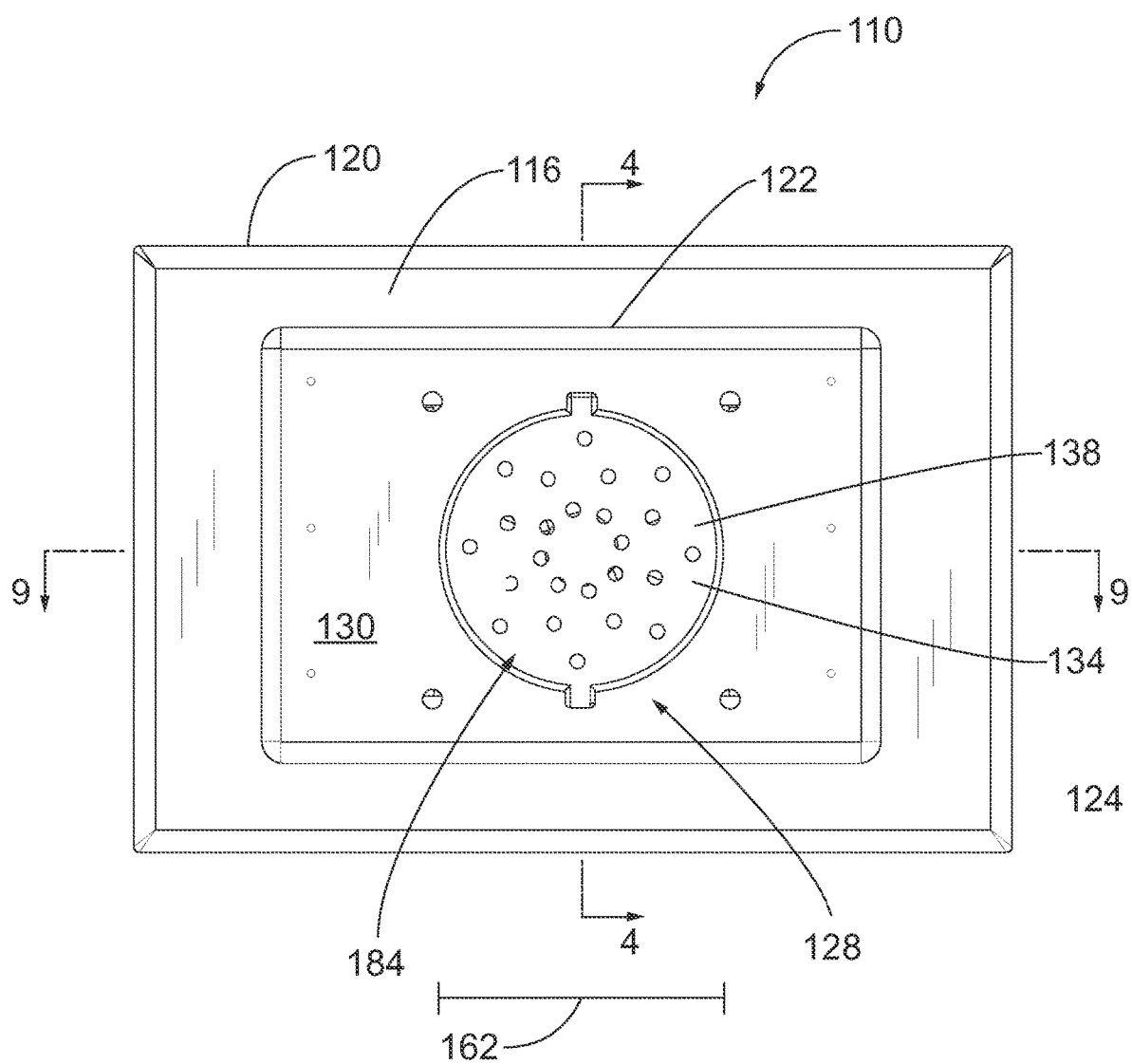
FIG. 7 is a bottom view of the carpenter bee trap of FIG. 5.

Next, FIGS. 5-7 depict perspective, side, and bottom views, respectively, of a carpenter bee trap 110, according to another embodiment of the invention. Similar to the trap 10 described above, trap 110 includes a plurality of sidewalls 112 that surround a trap cavity 114. In varying embodiments of the invention, any number of sidewalls 112 may be used. That is, it is contemplated that the trap 110 may more or less than four (4) sidewalls 112, in other embodiments of the invention. In addition, the trap 110 may vary in shape, and is not limited to the rectangular shape shown in FIGS. 5-7.

The trap 110 may also include a top wall 116 coupled to the top 118 of the sidewalls 112. The top wall 116 assists in further enclosing the trap cavity 114. In the representative embodiment of the invention, edges 120 of the top wall 116 extend beyond the sidewalls 112. However, in varying embodiments of the invention, each edge 120 of the top wall 116 may independently align with the outer surface 122 of a respective sidewall 112 or extend beyond the respective sidewall 112.

The trap 110 may also include a bottom wall 124 coupled to the bottom 126 of the sidewalls 112. The bottom wall 124 even further encloses the cavity 114. As shown in FIG. 7, the bottom wall 124 may include an opening 128 formed therethrough. While the opening 128 is illustrated as being centrally located on the bottom surface 130 of the bottom wall 124, it is contemplated that the opening 128 may be located at any location on the bottom surface 130 of the bottom wall 124. Opening 128 operates as an exit for the trap cavity 114.

At least one opening 132 is formed through at least one of the sidewalls 112 to act as an entrance to the trap 10. That is, each sidewall 112 may include any number of openings 132, including zero. The openings 132 are configured to operate as entrances into the cavity 114 for the carpenter bees. The configuration of the openings 132 will be further described below with respect to FIG. 8.

FIG. 5 illustrates the sidewalls 112 as being oriented perpendicular to the top wall 116 and perpendicular to the bottom wall 124. However, the sidewalls 112 may be independently oriented at any angle with respect to the top wall 116 and the bottom wall 124.

The trap 110 also includes a container 134 disposed at the bottom 136 of the trap 110. The container 134 extends from within the cavity 114, through the opening 128, and out into the external environment. In this representative embodiment of the invention, the container 134 is removable from the exit opening 128, which allows a user to empty the trap 110.

Figure 8:
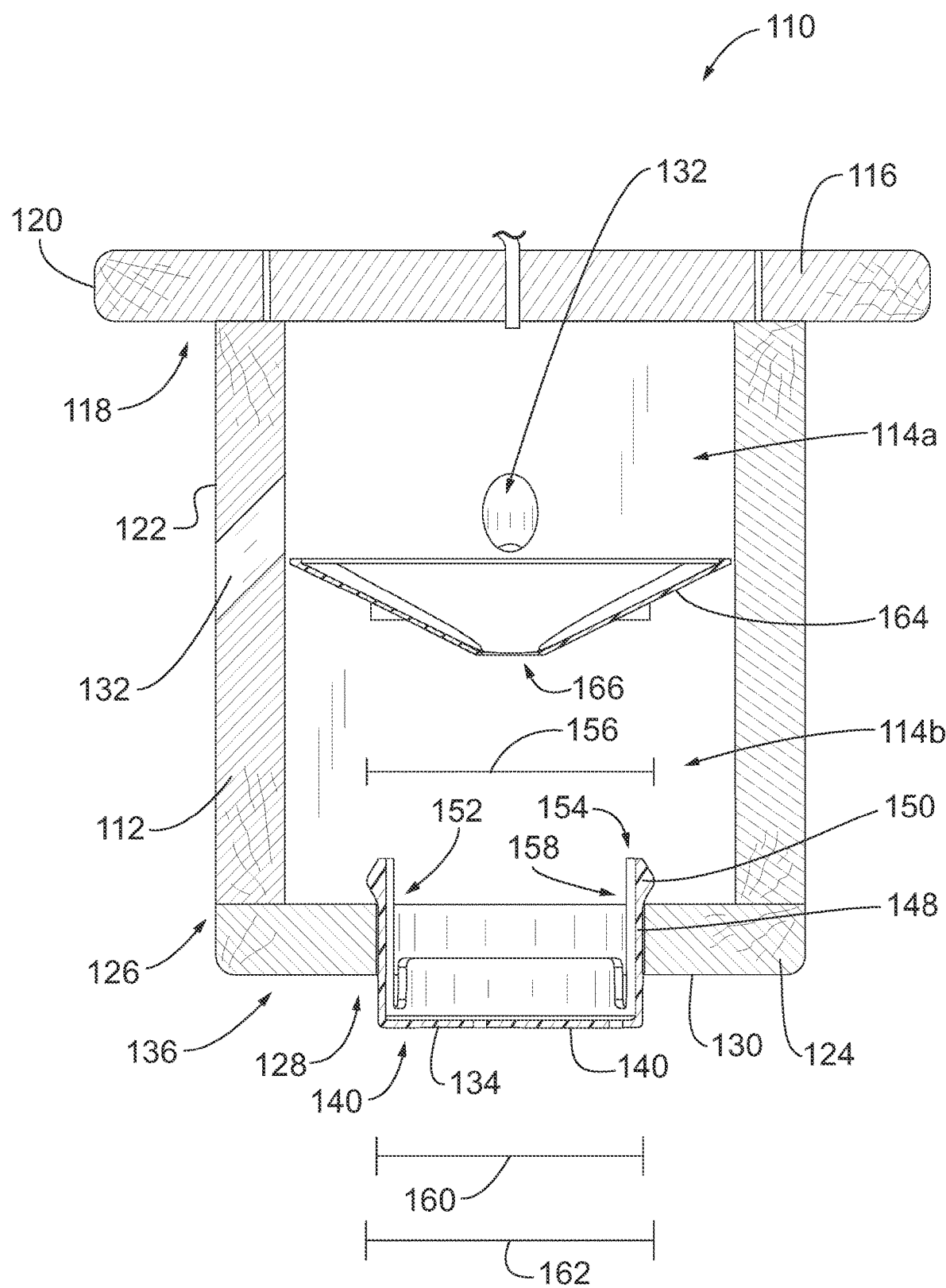
FIG. 8 is a cross-sectional view of the carpenter bee trap of FIG. 7, taken along line 8-8.
Figure 9:
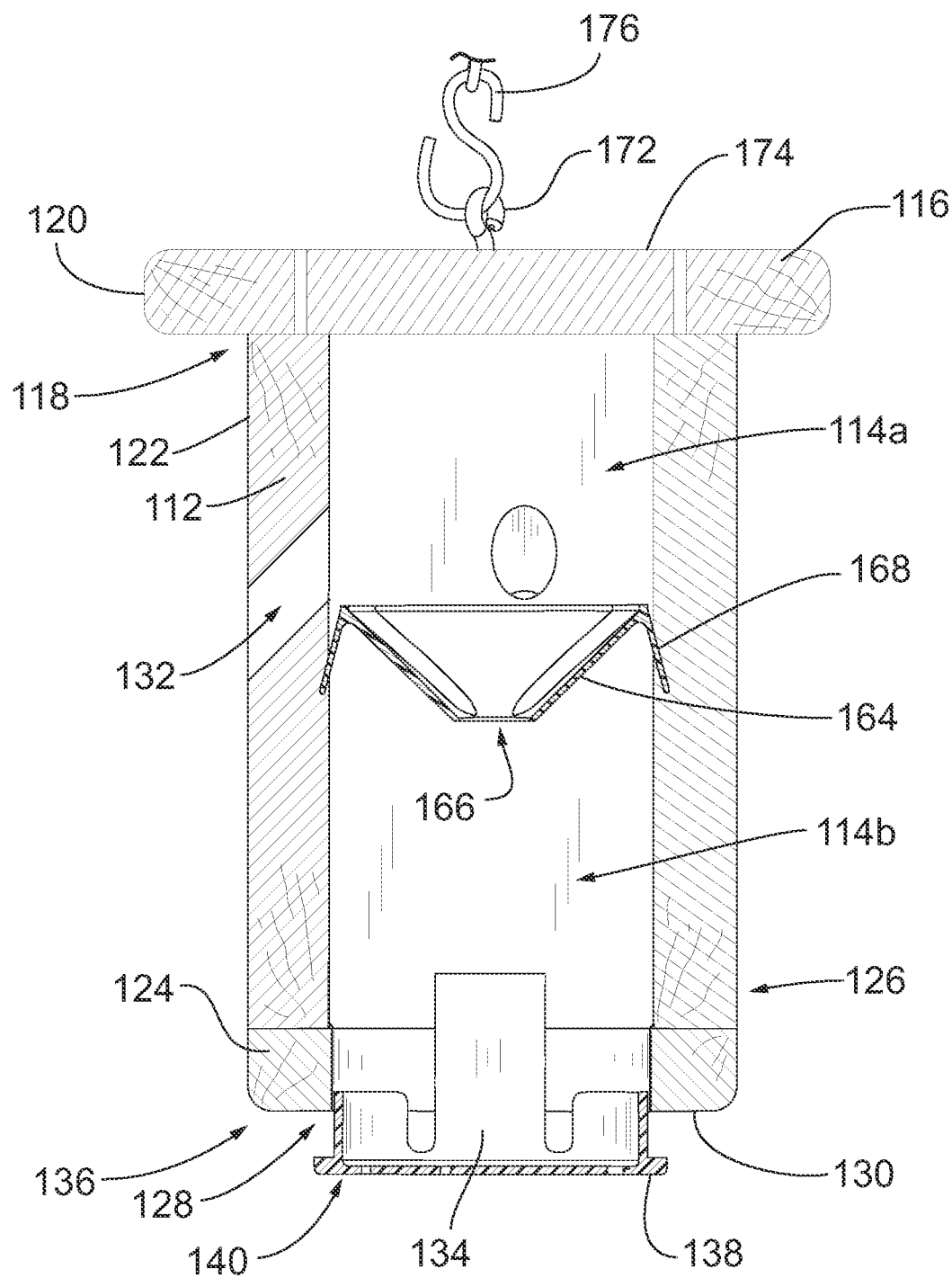
FIG. 9 is a cross-sectional view of the carpenter bee trap of FIG. 7, taken along line 9-9.

Next, FIGS. 8 and 9 depict cross-sectional views of the trap 110 to better show the cavity 114, the container 134 within the cavity 114, and a funnel 164 disposed within the cavity 114. As shown, the funnel 164 is suspended within the cavity 114 and separates the cavity 114 into an upper cavity 114a and a lower cavity 114b.

Referring to FIG. 8, the container 134 is illustrated as having a main body 148, a bottom wall 138 disposed at the bottom 140 of the container 134, and a flanged portion 150 extending from the top 152 of the main body 148. In the representative embodiment of the invention, the container 134 and its walls thicken to increase the outer diameter of the container 134. As a result, the flanged portion 150 has a larger diameter 156 than a diameter 160 of the main body 148 of the container 134.

In addition, the diameter 156 of the flanged portion 150 is larger than the exit opening 128 formed in the bottom wall 124 of the trap 110. As a result of the above, the container 134 is able to maintain its position with the flanged portion 150 disposed in the cavity 114, the main body 148 extending through the exit opening 128, and the main body 148 extending beyond and away from the bottom 136 of the trap 110 without the assistance of a coupling means.

FIG. 9 depicts the interaction between the funnel 164 and an inner surface 170 of the sidewalls 112. The funnel 164 includes a plurality of flanges 168 extending outwardly from the funnel 164. The flanges 168 are oriented to push against the inner surface 170 of a respective sidewall 112 in order to maintain the funnel 164 in a suspended position within the cavity 114. The funnel 164 acts to direct the bees from the upper cavity 114a to the lower cavity 114b. Once the bees enter to the lower cavity 114b of the trap 110, they are unable to escape from the trap 110 until the container 134 is removed by a user.

While the representative embodiment of the invention illustrates the funnel 164 including two (2) flanges 168, it is contemplated that the funnel 164 may include any number of flange 168 more or less than two (2), in other embodiments of the invention.

FIGS. 8 and 9 also depict the orientation of the openings 132 in the sidewalls 112. For example, the openings 132 in the sidewalls 112 are oriented at an upward angle. However, in other embodiments of the invention, the openings 132 may be oriented at any angle.

Referring again to FIGS. 5 and 6, a mounting element 172 is coupled to a top surface 174 of the top wall 116. In the representative embodiment of the invention, the mounting element 172 is a mounting hook screwed into the top wall 116 of the trap 110. In other embodiments of the invention, the mounting element 172 may be other mounting means coupled to the top wall 116 of the trap 110. A chain or rope 176 is then coupled to the mounting element 172 in order to suspend the trap 110 from a mounting location, such as, but not limited to a rafter.

Figure 10:
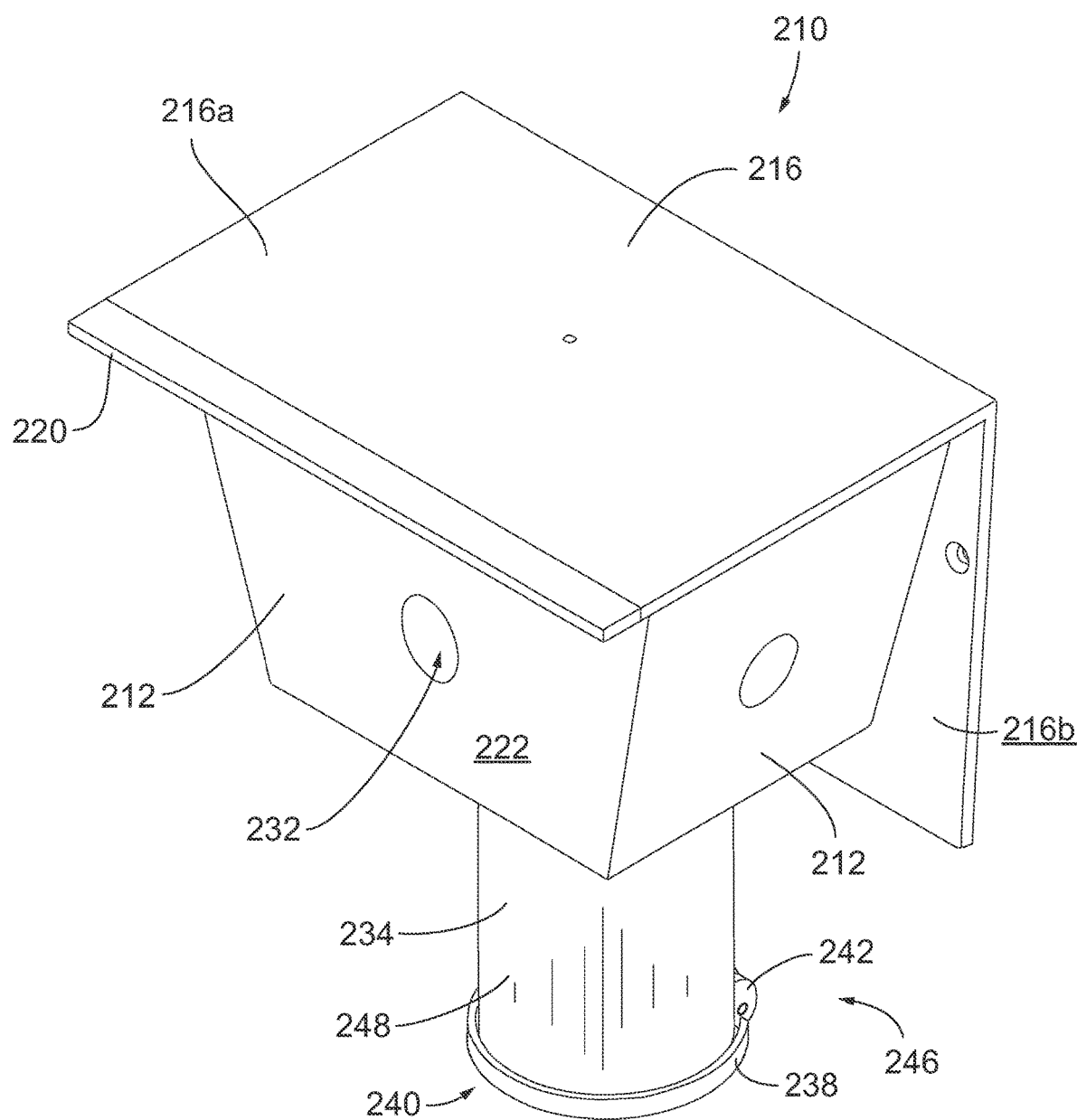
FIG. 10 is a perspective view of a carpenter bee trap, according to yet another embodiment of the invention.
Figure 11:
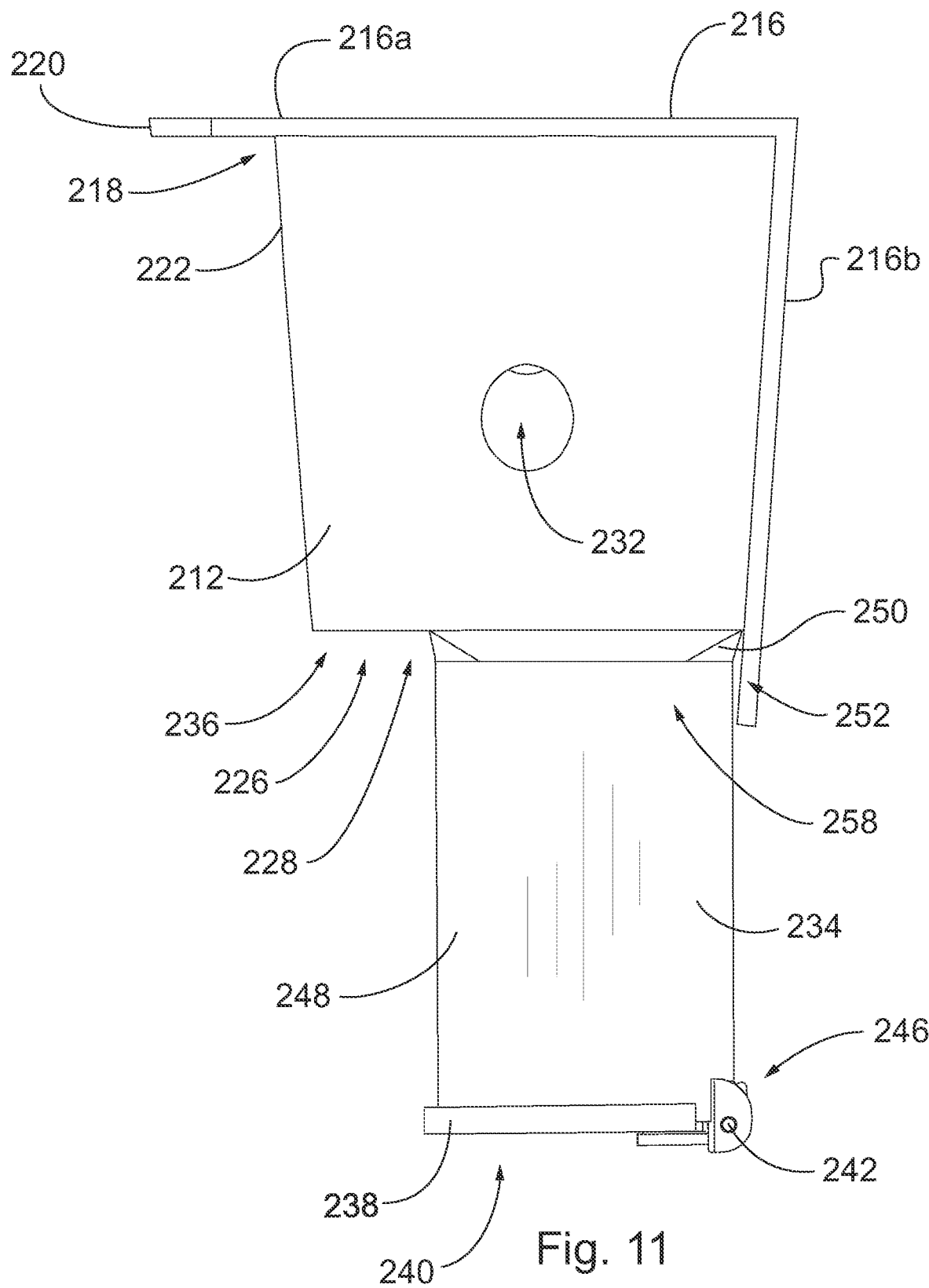
FIG. 11 is a side view of the carpenter bee trap of FIG. 10.
Figure 12:
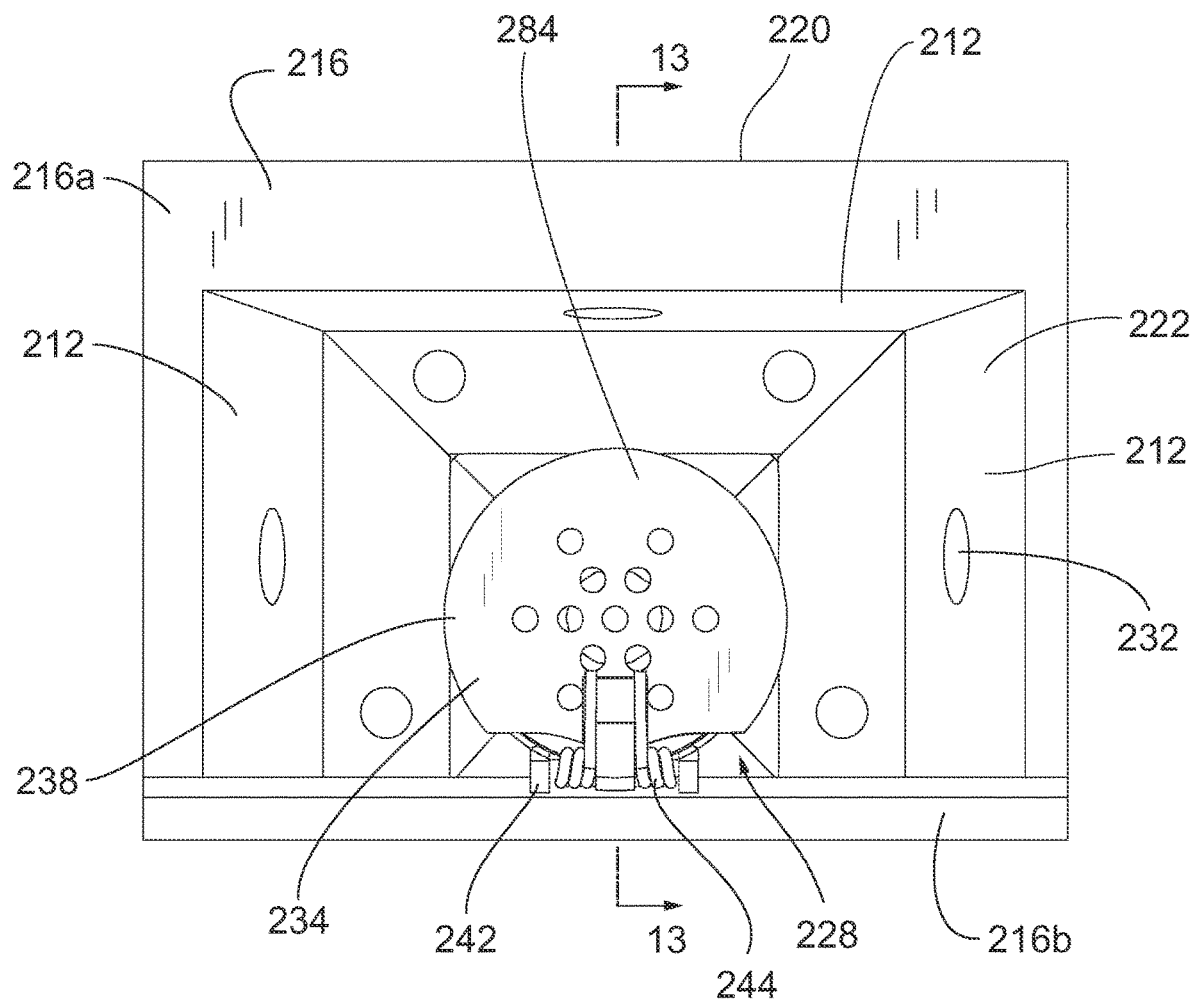
FIG. 12 is a bottom view of the carpenter bee trap of FIG. 10.

Referring next to FIGS. 10-12, perspective, side, and bottom views, respectively, are shown of a carpenter bee trap 210, according to another embodiment of the invention. The trap 210 has a trap cavity 214 surrounded by a plurality of sidewalls 212. The trap 210 further includes a top hood 216. The top hood 216 includes a first portion 216a and a second portion 216b. The first portion 216a of the top hood 216 is a top wall 216a of the trap 210 and is coupled to the top 218 of the sidewalls 212. Meanwhile, the second portion 216b of the top hood provides an additional sidewall 216b.

In the representative embodiment of the invention, there are three (3) sidewalls 212 and one (1) sidewall 216b formed by the second portion 216b of the hood 216. In other embodiments of the invention, the trap 210 may include more or less than three (3) sidewalls 212 and the second portion 216b of the hood 216 may form any number of additional sidewalls 216b. It is further contemplated that alternative embodiments of the trap 210 may be in a variety of shapes, not just the rectangular shape shown in FIG. 10.

In addition, while FIG. 10 shows a number of the edges 220 of the top wall 216a extending beyond the plurality of sidewalls 212, it is contemplated that each edge 220 of the top wall 216a may either align the outer surface 222 of a respective sidewall 212 or extend beyond the respective sidewall 212.

In this representative embodiment of the invention, the bottom 226 of the plurality of walls 212 surrounded an opening 228 at the bottom 236 of the trap 210. Opening 228 operates as an exit of the trap cavity 214. In addition, the plurality of sidewalls 212 may include at least one opening 232 is formed through at least one of the plurality of sidewalls 212 to act as an entrance to the trap 210. It is contemplated that the carpenter bees will enter the trap 210 through these openings 232. While the representative embodiment of the invention depicts an opening 232 in each sidewall 212, it is contemplated that any number of openings 232 may be formed through any number of sidewalls 212. For example, each sidewall 212 may individually include any number of openings 232, including no openings 232. In addition, sidewalls 216b may or may not include any number of openings 232. The configuration of the openings 232 will be further described below with respect to FIG. 12.

While FIG. 10 illustrates the each of the sidewalls 214 as extending from the top wall 216a at an angle, it is contemplated that the sidewalls 214 may be oriented perpendicular to the top wall 216a, in other embodiments of the invention. Further, the angle of each sidewall 14 is independent of the angle of the other sidewalls 14. In addition, while the sidewall 216b is depicted as being oriented perpendicular to the top wall 216a, it is further contemplated that the sidewall 216b may extend from the top wall 216a at an angle other than perpendicular.

A container 234 extends from within the cavity 214, through the opening 228 at the bottom 236 of the trap 210, and out into the external environment. Once the bees enter the trap 210 through the openings 232 described above, the bees transition to the container 234 and become caught in the container 234, where they can collect. As shown in FIGS. 10 and 11, the container 234 includes a door 238 disposed at the bottom 240 of the container 234. A hinge 242 rotatably couples the door 238 to the bottom 240 of the container 234. In the representative embodiment of the invention, the hinge 242 includes a biasing element 244 that maintains the door 238 in a closed position 246. The closed position 246 is depicted in FIGS. 10 and 11. A user may manipulate the door 238 from the closed position 246 to an open position (not shown). In the closed position 246, the bees may collect within the container 234. In the open position, the bees are emptied from the container 234 by gravity. In embodiments of the invention including the biasing element 244, the door 238 automatically transitions from the open position to the closed position 246 when the user releases the door 238.

In alternative embodiments of the invention, the hinge 242 may not include a biasing element 244. In these embodiments of the invention, a retaining device, such as, but not limited to a clip, may be used to retain the door 238 in the closed position 246. For example, a user would be able to release the door 238 from the retaining device, open the door 238 to empty the trap 210, close the door 238, and retain the door 238 in the closed position 246 with the retaining device.

Figure 13:
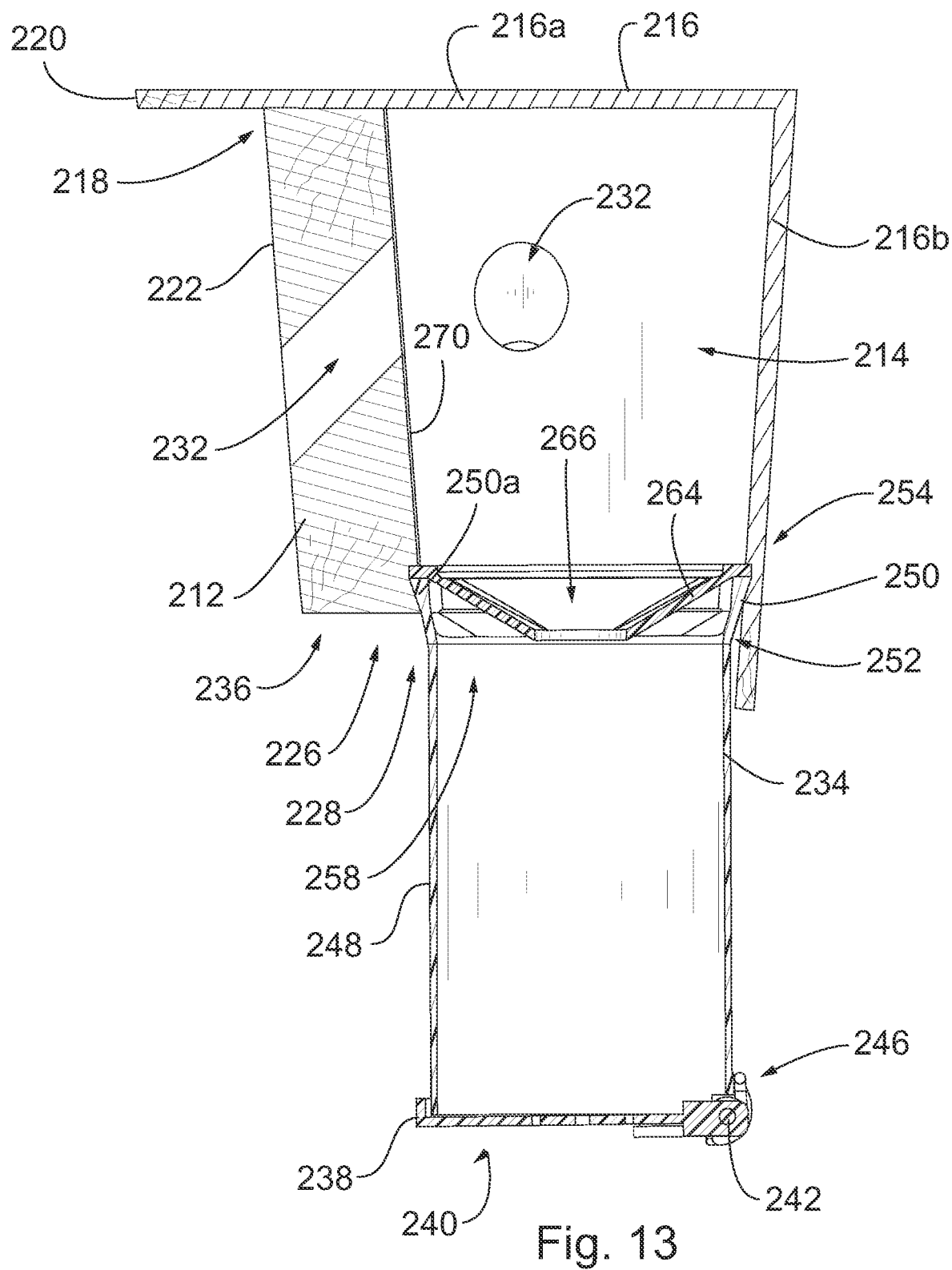
FIG. 13 is a cross-sectional view of the carpenter bee trap of FIG. 12, taken along line 13-13.

Next, FIG. 13 depicts a cross-sectional view of the trap 210 to further illustrate the cavity 214 of the trap 210 and the container 234 extending from within the cavity 214, through the opening 228 at the bottom 236 of the trap 210, and out into the external environment. As shown in FIGS. 10-13, the container 234 includes a main body 248 that is cylindrical in shape. In other embodiments of the invention, the main body 248 may be any other shape other than that of a cylinder. It is the main body 248 of the container 234 that extends through the opening 228 and into the external environment.

The container 234 further includes a flanged portion 250 that extends from the top 252 of the main body 248 of the container 234 at an angle between 0 and 90 degrees. As a result of the flanged portion 250 extending upward and outward from the top 252 of the main body 248, the width of the funnel portion 250 increases from the bottom 258 to the top 254 of the funnel portion 250. As a result, the top 254 of the funnel portion 250 is sized larger than the bottom 258 of the funnel portion 250.

As shown in FIG. 13, the flanged portion 250 extends along an inner surface 270 of the sidewalls 212 of the trap 210. Further, each wall 250a of the flanged portion 250 extends along the inner surface 270 of a respective sidewall 212 at the same angle as the respective sidewall 212. That is, the shape of the flanged portion 250 matches the shape of the trap cavity 214. As a result, the flanged portion 250 of the container 234 is suspended within the cavity 214 without the assistance of a coupling device or material. The flanged portion 250 further extends through the opening 228 and the main body 248 extends into the external environment.

In alternative embodiments of the invention, the flanged portion 250 may include a biasing feature that applies a force to the inner surface 270 of at least one sidewall 212 to assist in suspending the flanged portion 250 of the container 250 within the cavity 214 without the assistance of a coupling device or material.

In addition, the container 234 includes a funnel 264 within the flanged portion 150 to direct the carpenter bees to the main body 248 of the container 234. The funnel 264 extends from the top 254 of the flanged portion 250 to a container opening 266 at the bottom 258 of the flanged portion 50, which is aligned with the top 252 of the main body 248. As shown in FIG. 13, the funnel 264 extends from the top 254 of the flanged portion 250 at an angle between 0 and 90 degrees in order to properly direct the bees to the main body 248 of the container 234.

FIG. 13 also depicts the orientation of the openings 232 in the sidewalls 212. In the representative embodiment of the invention, the openings 232 in the sidewalls 212 are oriented at an upward angle. In other embodiments of the invention, the openings 232 may be oriented at any angle.

Figure 14:
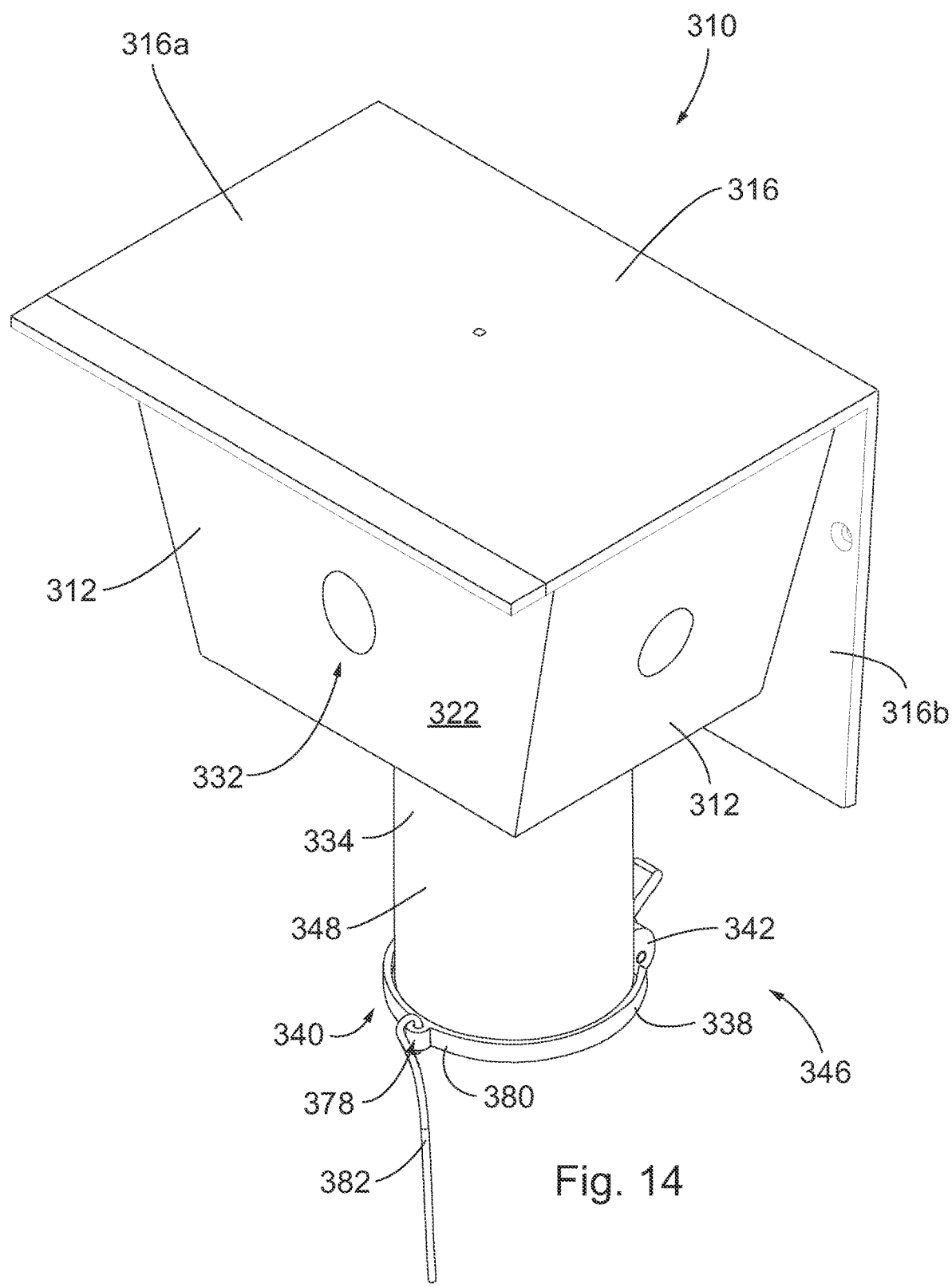
FIG. 14 is a perspective view of a carpenter bee trap, according to another embodiment of the invention.

Next, FIG. 14 depicts a perspective view of a carpenter bee trap 310, according to another embodiment of the invention. The construction of trap 310 is much the same as trap 210 described above. In this representative embodiment of the invention, the door 338 includes an orifice 372 protruding from a rim 374 of the door 338. The orifice 372 is configured to receive material, such as, but not limited to a string 376. The string 376 is able to be threaded through the orifice 372 and secured so as to hang from the door 338 of the trap 310. The string 376 provides a pulling device for a user to manipulate the door 338 from the closed position 346 to the open position. As a result of the pulling device 376 shown in FIG. 14, a user does not need to climb up to the trap 310 in order to open the door 338. The string 376 can be of any length that would allow the user to open the trap 310 from a comfortable position, such as, but not limited to the standing on the ground.

In varying embodiments of the traps 10, 210, 310 described above, each of the doors 84, 284, 384, respectively, may include a plurality of perforations 84, 284, 384, respectively. The perforations 84, 284, 384, allow airflow between the inside of the container 34, 234, 334 and the external environment. In varying embodiments of the trap 110 described above, the bottom wall 138 may include a plurality of perforations 184 that allow airflow between the inside of the container 134 and the external environment. One benefit of allowing airflow, is that the scent and sound associated with the carpenter bees within the container can act as an attractant for more carpenter bees.

While the embodiments described above and shown in FIGS. 1-12 illustrate their respective containers 34, 134, 234, 334 as being oriented vertically and extending from the bottom of the trap, it is also contemplated that the containers 34, 134, 234, 334 may be oriented horizontally. In such embodiments of the invention, the exit opening 28, 128, 228, 328 through which the container 34, 134, 234, 334 extends through would be formed through one of the sidewalls 12, 112, 212, 312 of the trap.

Now referring to FIGS. 15-17 and 19, perspective, side, and bottom views of carpenter trap 410 are shown, according to another embodiment of the invention. The trap 410 includes a plurality of sidewalls 412 surrounding a trap cavity 414. While the representative embodiment of the invention is shown as having four (4) sidewalls 412, it is contemplated that the trap 410 may have more or less than four (4) sidewalls 412 in varying embodiments of the invention. Further, the trap 410 may vary in shape, and is not limited to the rectangular shape shown in FIGS. 15-17 and 19.

The trap 410 also includes a top wall 416 that is coupled to the top 418 of each of the plurality of walls 412 and further encloses the cavity 414. In the representative embodiment of the invention, the edges 420 of the top wall 416 extend beyond the plurality of sidewalls 412. However, each edge 420 of the top wall 416 may extend beyond or align with the outer surface 422 of a respective sidewall 412 in varying embodiments of the invention.

At least one entrance opening 432 is formed through at least one of the plurality of sidewalls 412. It is contemplated that the carpenter bees will enter the trap 410 through the openings 432. While the representative embodiment shows an opening 432 formed in each sidewall 412, varying embodiments of the invention may have any number of openings 432 formed in any number of sidewalls 412. For example, each sidewall 412 may individually include any number of openings 432 formed therethrough, including no openings 432. The configuration of the openings 32 will be further described below with respect to FIG. 18.

FIGS. 15-17 and 19 also depict the trap 410 including a bottom wall 424 coupled to the bottom 426 of the plurality of walls 412 and further enclosing the cavity 414. In the representative embodiment of the invention, an exit opening 428 is formed in one of the sidewalls 412 as opposed the bottom wall 424. While the exit opening 428 is illustrated as being located below the entrance openings 432 of the sidewalls 412, it is contemplated that the exit opening 428 may be located at any location on the outer surface 422 of the sidewall 412. The opening 428 acts as an exit for the trap cavity 414.

Figure 15:
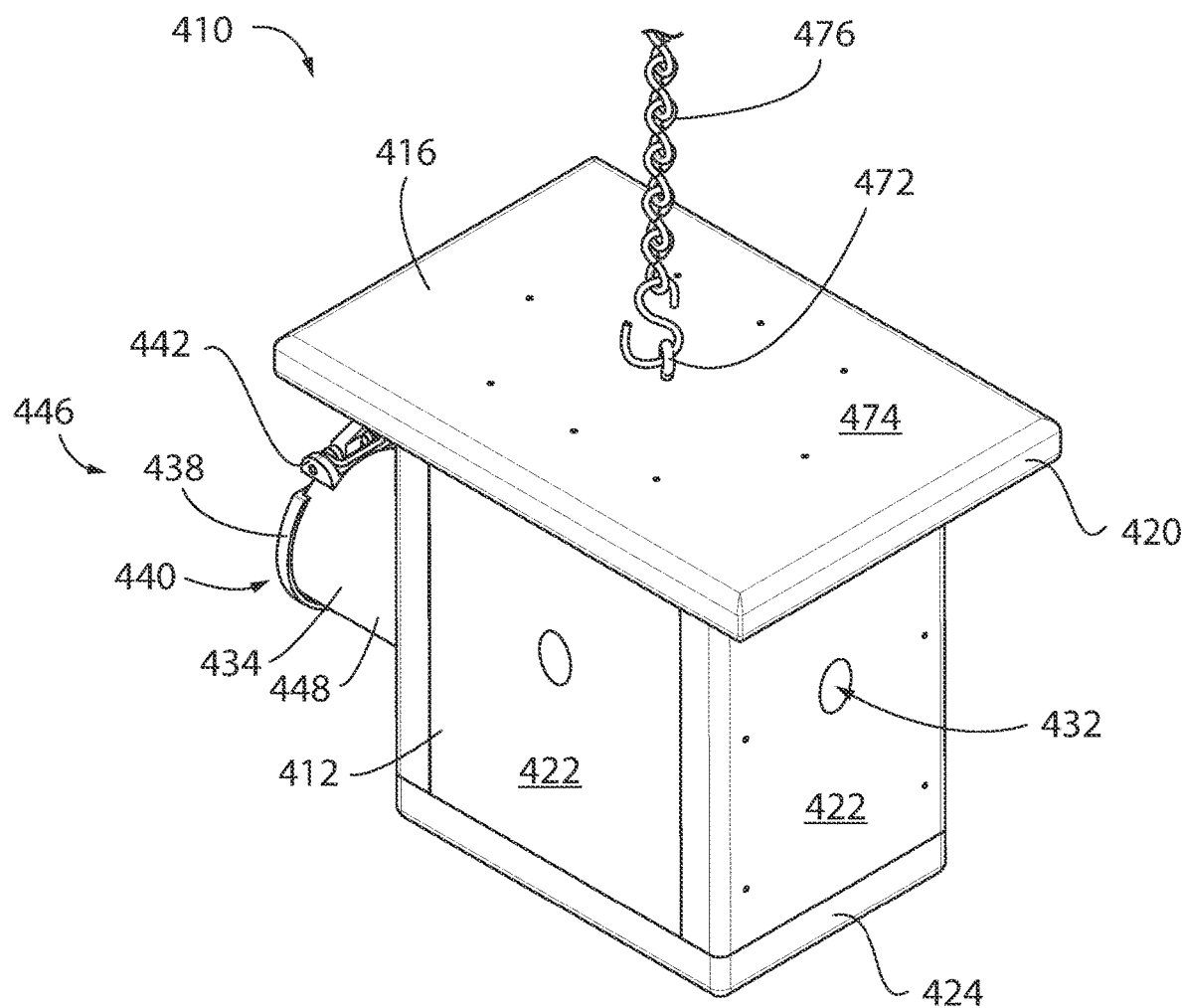
FIG. 15 is a perspective view of a carpenter bee trap, according to an embodiment of the invention.
Figure 16:
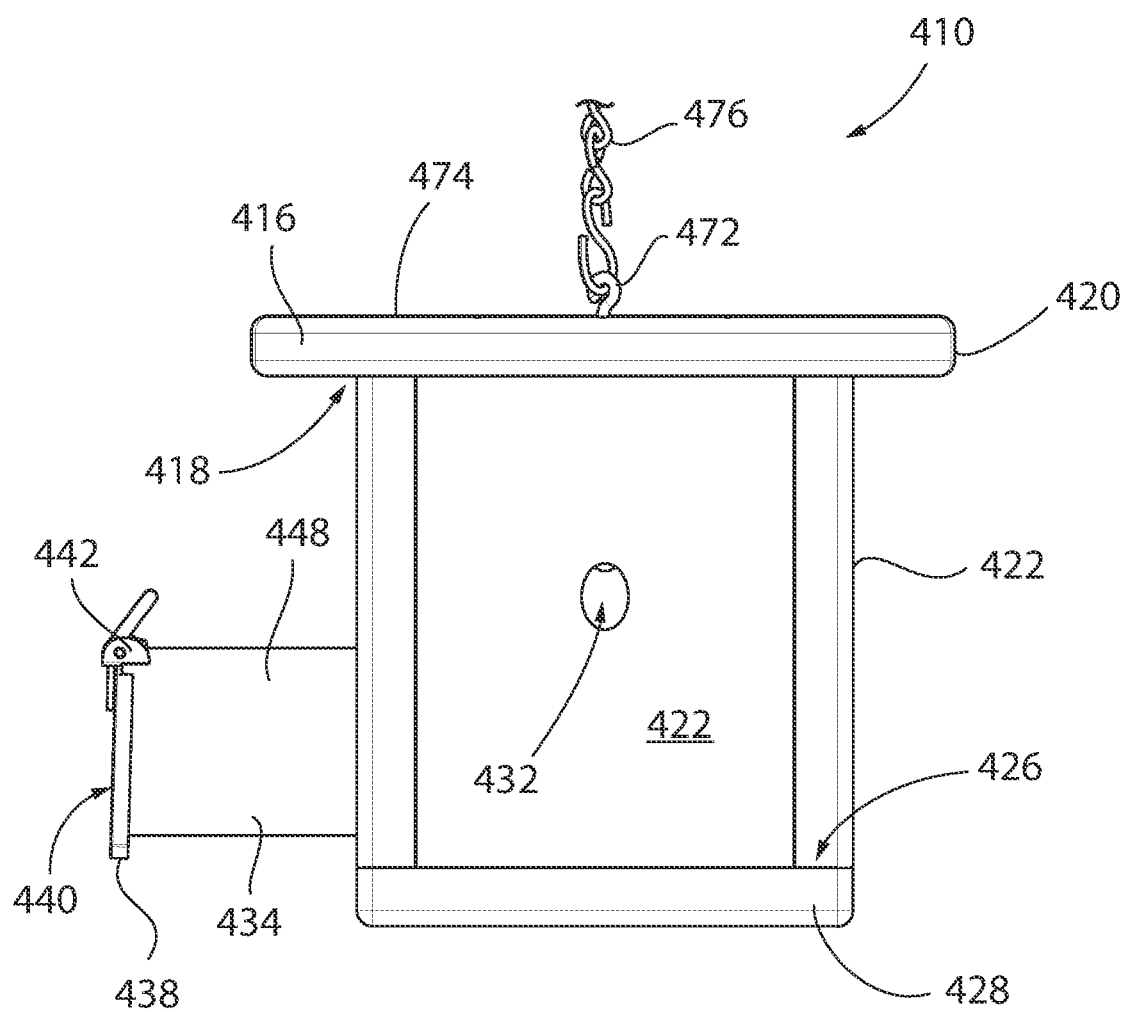
FIG. 16 is a first side view of the carpenter bee trap of FIG. 15.
Figure 17:
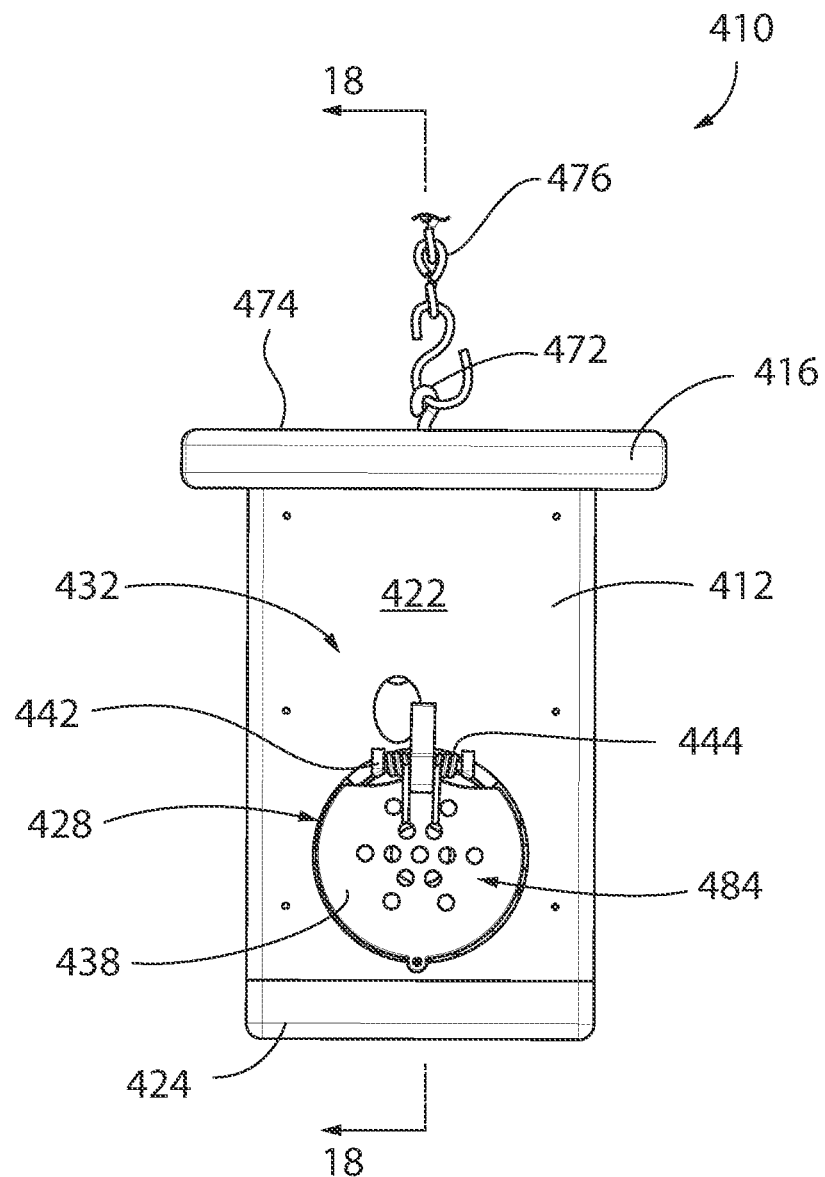
FIG. 17 is a second side view of the carpenter bee trap of FIG. 15.

While FIGS. 15-17 illustrate the sidewalls 414 as being oriented perpendicular to the top wall 416 and perpendicular to the bottom wall 424, it is contemplated that the sidewalls 412 may be oriented at varying angles in different embodiments of the invention.

A container 434 is configured to extend from within the cavity 414, through the exit opening 428, and out into the external environment. Once the bees enter the trap 410 through the entrance openings 432 described above, the bees may then transition to the container 434 and become caught and collect in the container 434. The container 434 includes a door 438 disposed at a first end 440 of the container 434. The door 438 is rotatably coupled to the first end 440 of the container 434 by a hinge 442. As shown in FIG. 17, the hinge 442 may include a biasing element 444 that maintains the door 438 in a closed position 446, as shown in the figures.

The door 438 is able to be manipulated by a user from the closed position 446 to an open position (not shown). In embodiments of the invention including the biasing element 444, the door 438 is automatically transition from the open position to the close position 446 when the user stops manipulating the door 438. In the closed position 446, the bees may collect within the container 434, as discussed above. In the open position, the bees may be emptied from the container 434 at a moment determined by the user.

In embodiments of the invention with or without the biasing element 444, a retaining device, such as, but not limited to a clip, may be used to retain the door 438 is the closed position 446. That is, a user would be able to release the door 438 from the retaining device, open the door 438 to empty the trap 410, close the door 438, and retain the door 438 by way of the retaining device.

In varying embodiments of the trap 410, the door 438 may include a plurality of perforations 484. The perforations 484 allow airflow between the inside of the container 434 and the external environment. One benefit of allowing airflow, is that the scent and sound associated with the carpenter bees within the container can act as an attractant for more carpenter bees.

Figure 18:
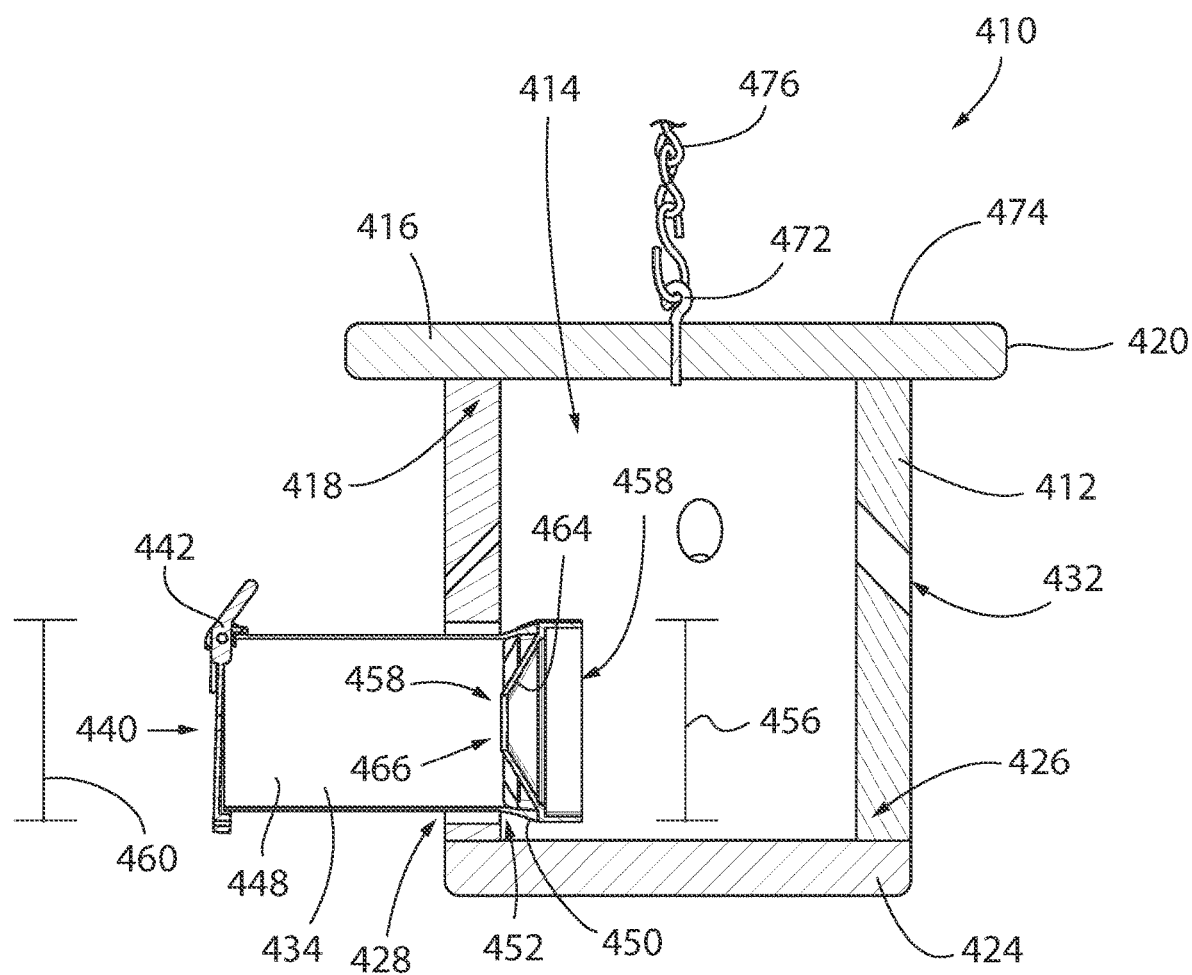
FIG. 18 is a cross-sectional view of the carpenter bee trap of FIG. 17, taken along line 18-18.
Figure 19:
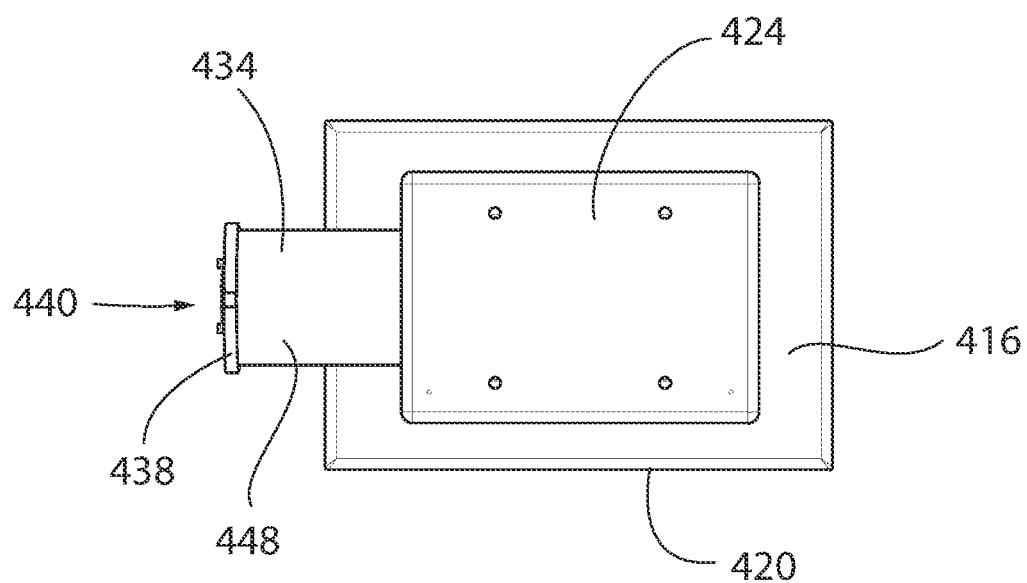
FIG. 19 is a bottom view of the carpenter bee trap of FIG. 15.
Figure 20:
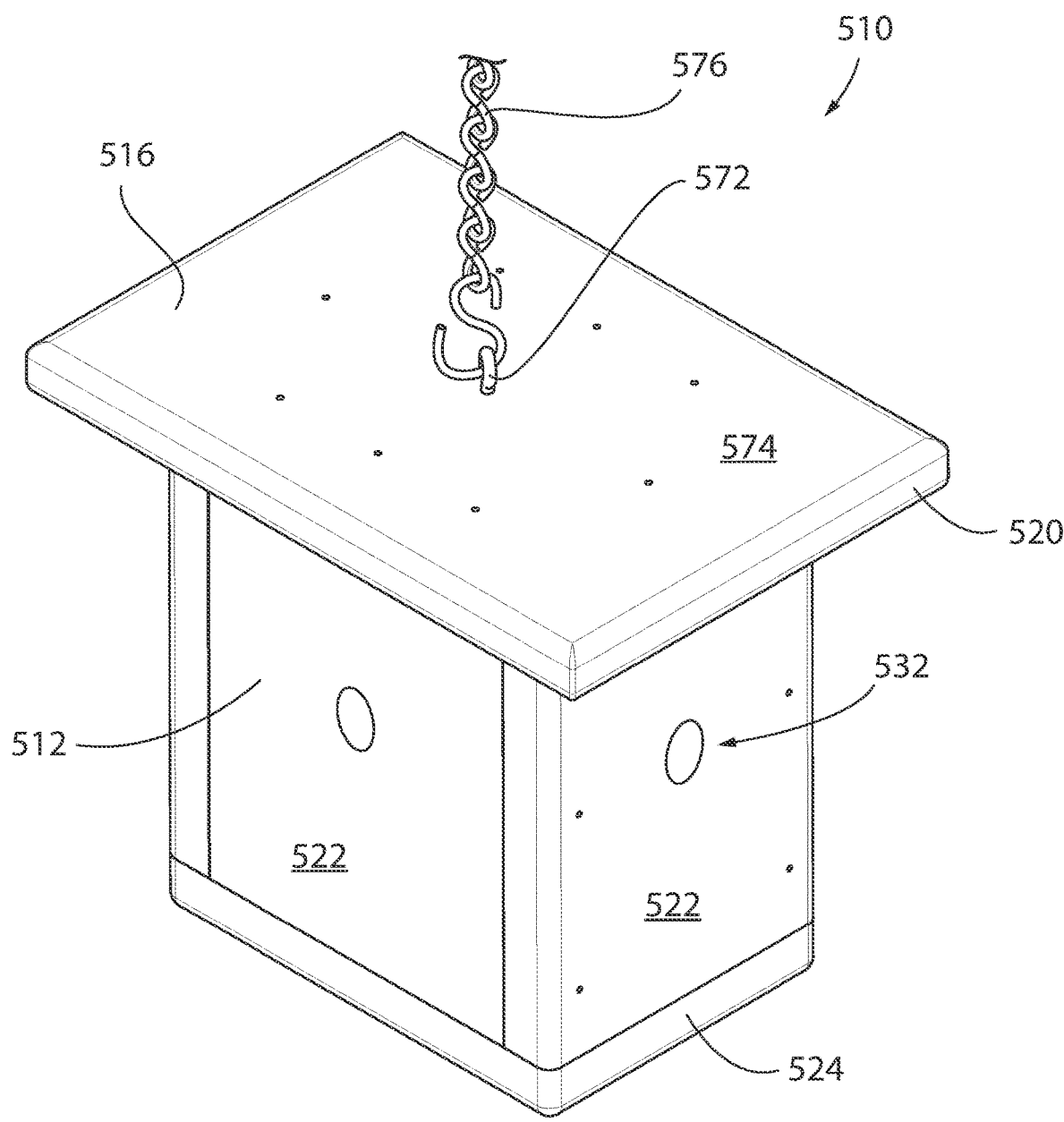
FIG. 20 is a perspective view of a carpenter bee trap, according to another embodiment of the invention.
Figure 21:
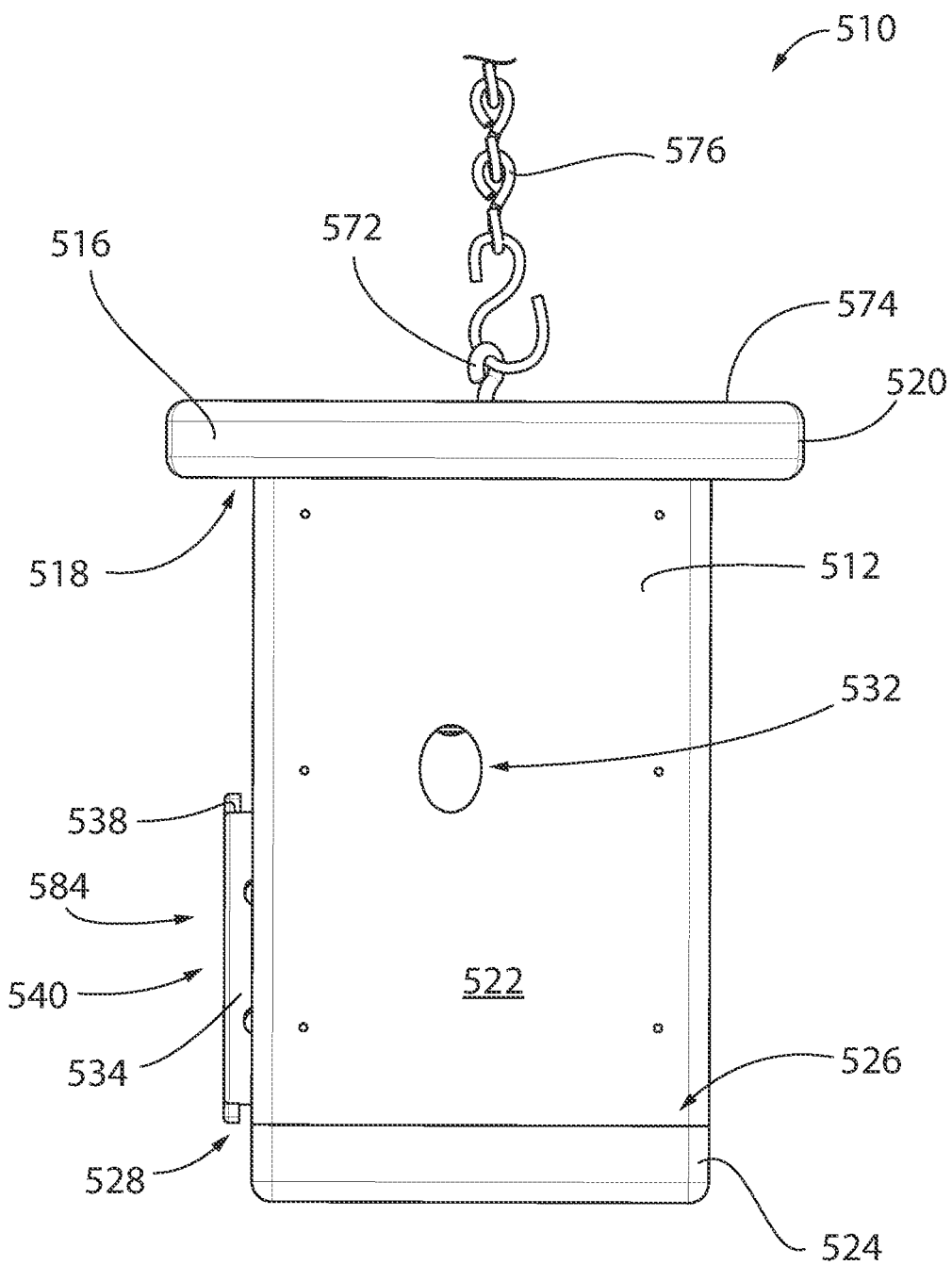
FIG. 21 is a first side view of the carpenter bee trap of FIG. 20.
Figure 22:
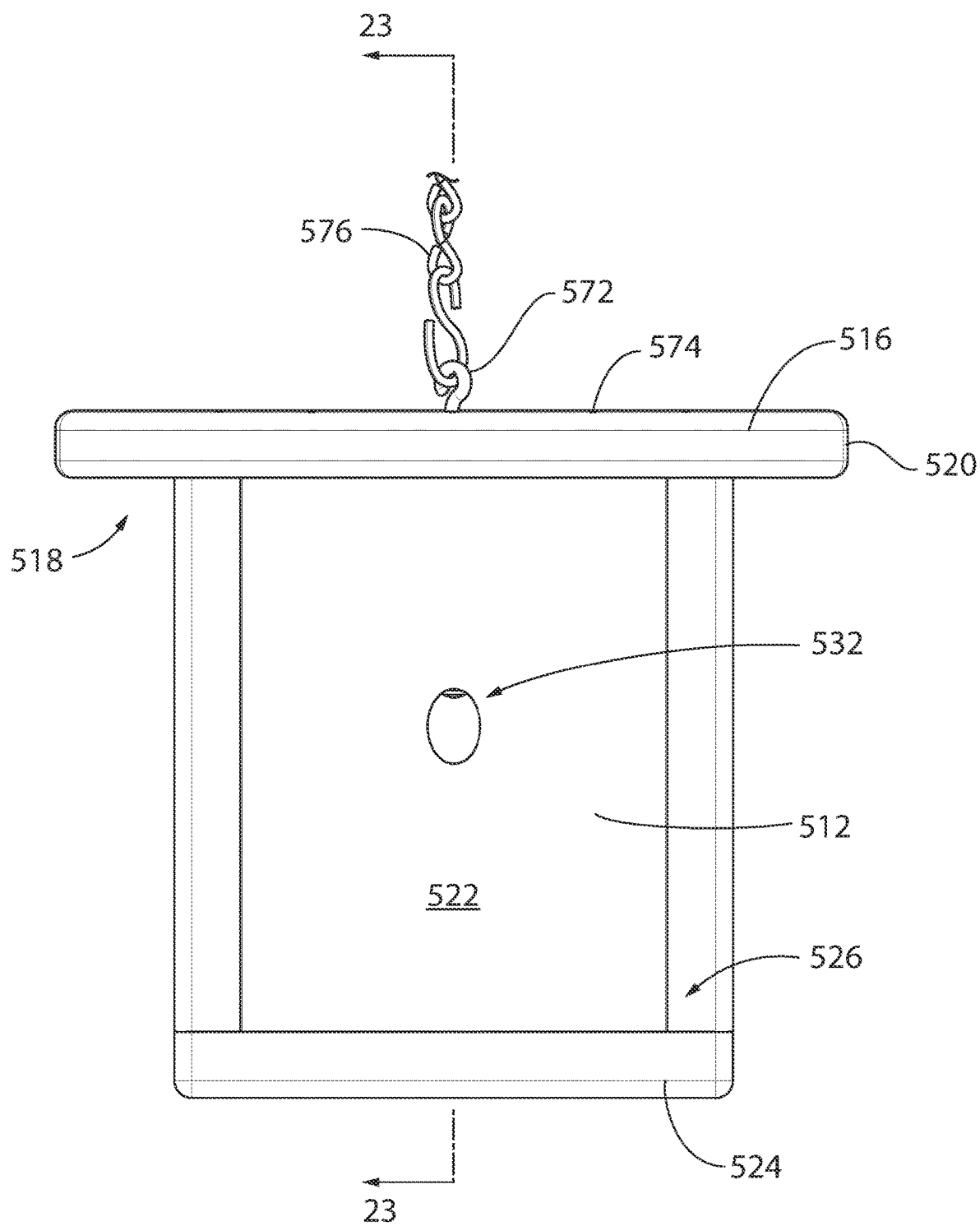
FIG. 22 is a second side view of the carpenter bee trap of FIG. 20.

Next, FIG. 18 depicts a cross-sectional view of the trap 410 in order to further illustrate the cavity 14 of the trap, the container 34, and the entrance openings 432. In the representative embodiment of the invention, the container 434 includes a main body 448 that is cylindrical in shape, but may have other shapes in varying embodiments of the invention. The main body 448 of the container 434 extends through the exit opening 38 in the sidewall 412 and into the external environment. The container 434 also includes a flanged portion 450 extending from an end 452 of the main body 448 of the container 434 opposite the first end 440 of the container 434.

The flanged portion 450 extends from the end 452 of the main body 448 at an angle between 0 and 90 degrees so that the end 454 of the flanged portion 450 spaced apart from the main body 448 has a diameter 456, while the end 458 of the flanged portion 450 aligned with the main body 448 has a diameter 460. As shown in FIG. 18, diameter 456 is greater than diameter 460.

In addition, the diameter 456 is greater than a diameter 462 of the exit opening 428 formed in the sidewall 412 of the trap 410. By increasing the diameter along the flanged portion 450, the flanged portion 450 of the container 434 is maintained within the cavity 414 of the trap 410 while the main body 448 of the container 434 extends through the exit opening 428 and into the external environment. Further, the container 434 may be suspended in a horizontal or substantially horizontal position, as shown in the representative embodiment.

The container 434 may also include a funnel 464 configured to direct the carpenter bees to the main body 448 of the container 434. The funnel extends from the end 454 of the flanged portion 450 spaced apart from the main body 448 to a container opening 466 aligned with the end 458 of the flanged portion 450 aligned with the main body 448 of the container 434. As shown in FIG. 18, the funnel 464 extends from one end 454 of the flanged portion 450 to the other end 458 of the flanged portion 450 at an angle between 0 and 90 degrees in order to properly direct the carpenter bees to the main body 448 of the container 434.

FIG. 18 also depicts the configuration of the entrance openings 432 in the sidewalls 412. For instance, the openings 432 may be oriented at an upward angle to assist in preventing the bees from escaping the trap cavity 414. In other embodiment of the invention, the openings 432 may be oriented at any angle, including horizontally, upward, or downward.

Referring back to FIGS. 15 and 16, the trap 410 may include a mounting element 472 coupled to a top surface 474 of the top wall 416. In the representative embodiment of the invention, the mounting element 472 is a mounting hook screwed into the top wall 416 of the trap 410. In other embodiments of the invention, the mounting element 72 may be other mounting means coupled to the top wall 416 of the trap 410. A chain or rope 476 may then be attached to the mounting element 472 in order to suspend the trap 410 from a mounting location, such as, but not limited to, the rafters or eaves of a wooden structure.

Next, FIGS. 20-22 and 25 depict perspective, side, and bottom views of a carpenter bee trap 510, according to yet another embodiment of the invention. Trap 510 includes a plurality of sidewalls 512 that surround a trap cavity 514. It is contemplated that varying embodiments of the invention may use more or less than the four (4) sidewalls 512 depicted in the representative embodiment of the invention. Additionally, the trap 510 may vary in shape and is not limited to the rectangular shape shown in FIGS. 20-22 and 25.

The trap 510 may also include a top wall 516 coupled to the top 518 of the sidewalls 512. In conjunction with the sidewalls 512, the top wall 516 further encloses the trap cavity 514. While the representative embodiment of the invention illustrates the edges 520 of the top wall 516 extending beyond the sidewalls 512, it is contemplated that each edge 520 of the top wall 516 may independently align with outer surface 522 of a respective sidewall 512 or extend beyond the respective sidewall 512, in varying embodiments of the invention.

The trap 510 may also include at least one entrance opening 532 formed through at least one of the plurality of sidewalls 512. The opening 532 is configured to allow a carpenter bee to enter the trap 510 through the opening 532. While the figures illustrate an opening 532 in three (3) of the four (4) walls 512, varying embodiments of the invention may include any number of openings 532 in any of the sidewalls 512. That is, each sidewall 512 may independent include any number of openings 532 formed therethrough ranging from zero (0) to n number of openings 532. The configuration of the openings 532 will be later described with respect to FIG. 23.

The trap 510 may also include a bottom wall 524 coupled to the bottom 526 of the sidewalls 512. In conjunction with the sidewalls 512, the bottom wall 524 further encloses the trap cavity 514. In the representative embodiment of the invention, an exit opening 528 is formed in one of the sidewalls 512. While the exit opening 528 is illustrated as being located below the entrance openings 532, the exit opening 528 may be located at any location through the sidewall 512, in varying embodiments of the invention. The opening 528 acts as an exit for the trap cavity 514.

While the representative embodiment of the invention depicts the sidewalls 512 as being perpendicular to both the top wall 516 and the bottom wall 525, it is also contemplated that the sidewalls 512 may be oriented at varying angles in other embodiments of the invention.

A container 534 is configured to extend from within the cavity 514, through the exit opening 528, and out into the external environment. The container 534 is configured to be removable from the exit opening 528 in order to allow a user to empty the trap 510.

Figure 23:
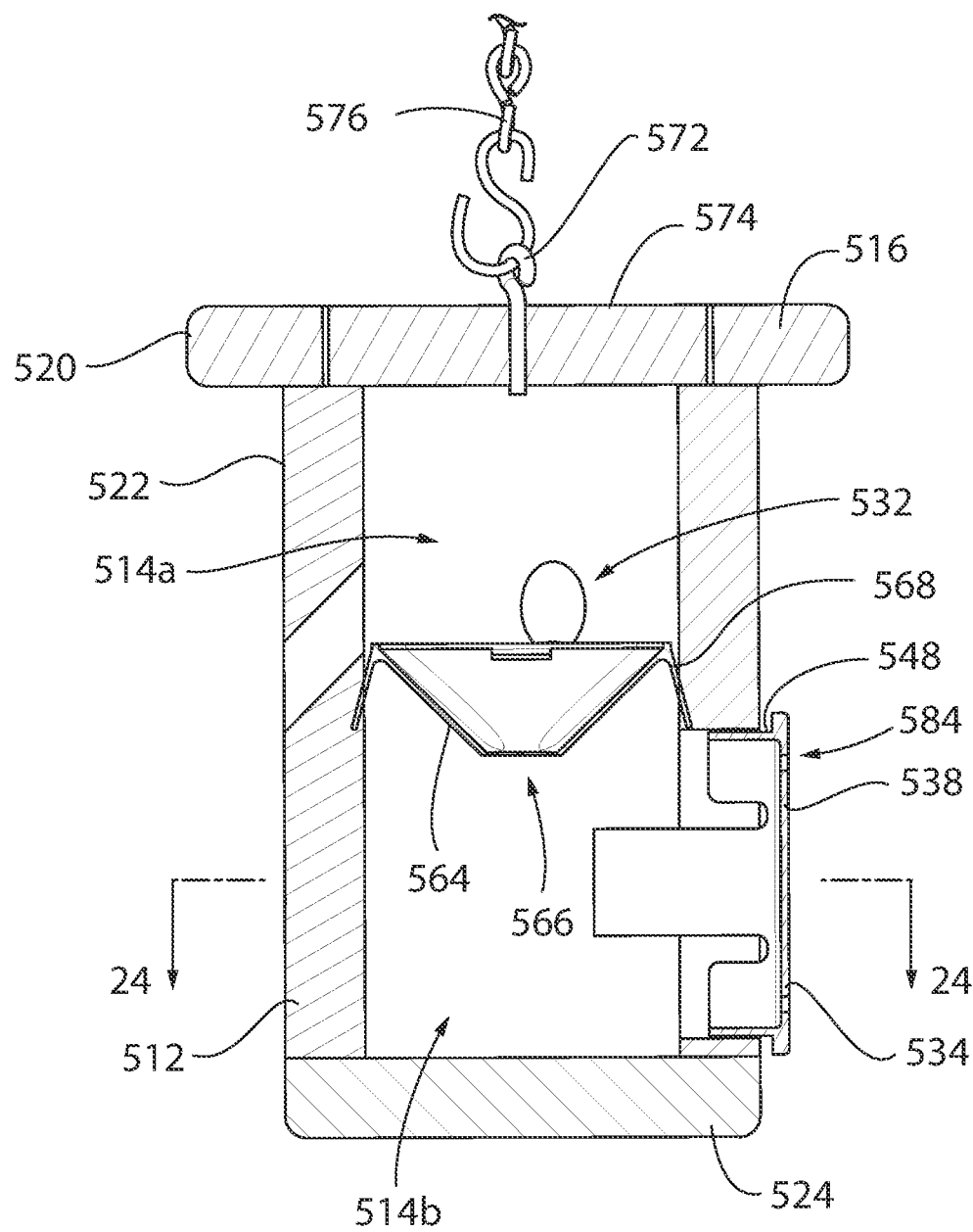
FIG. 23 is a cross-sectional view of the carpenter bee trap of FIG. 22, taken along line 23-23.
Figure 24:
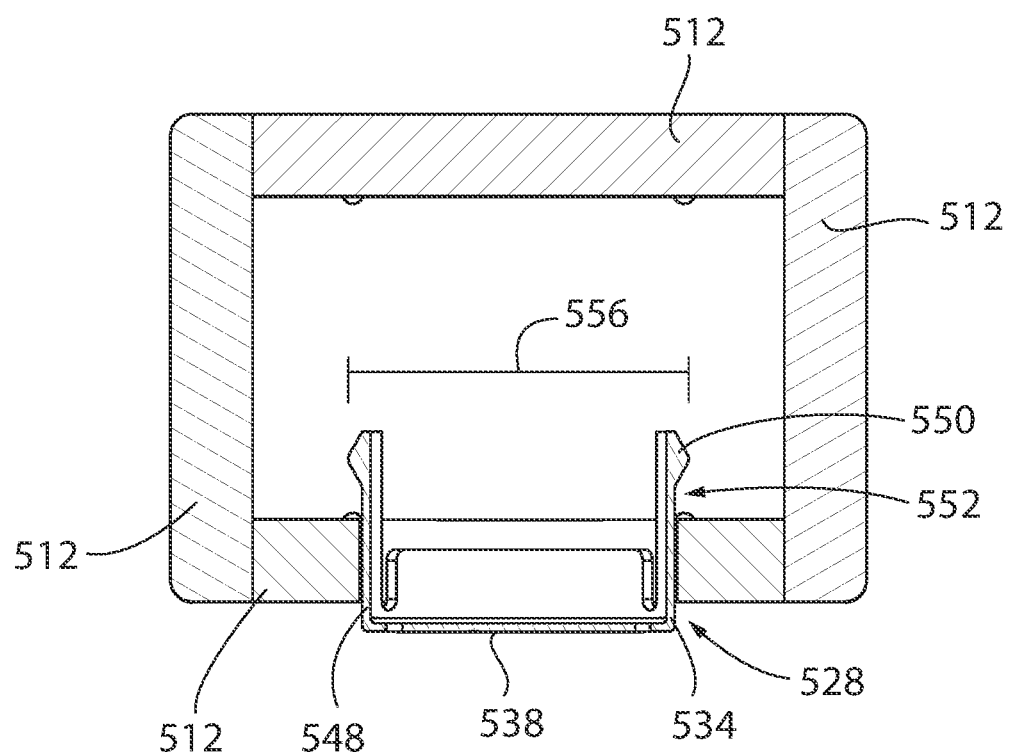
FIG. 24 is a cross-sectional view of the carpenter bee trap of FIG. 23, taken along line 24-24.
Figure 25:
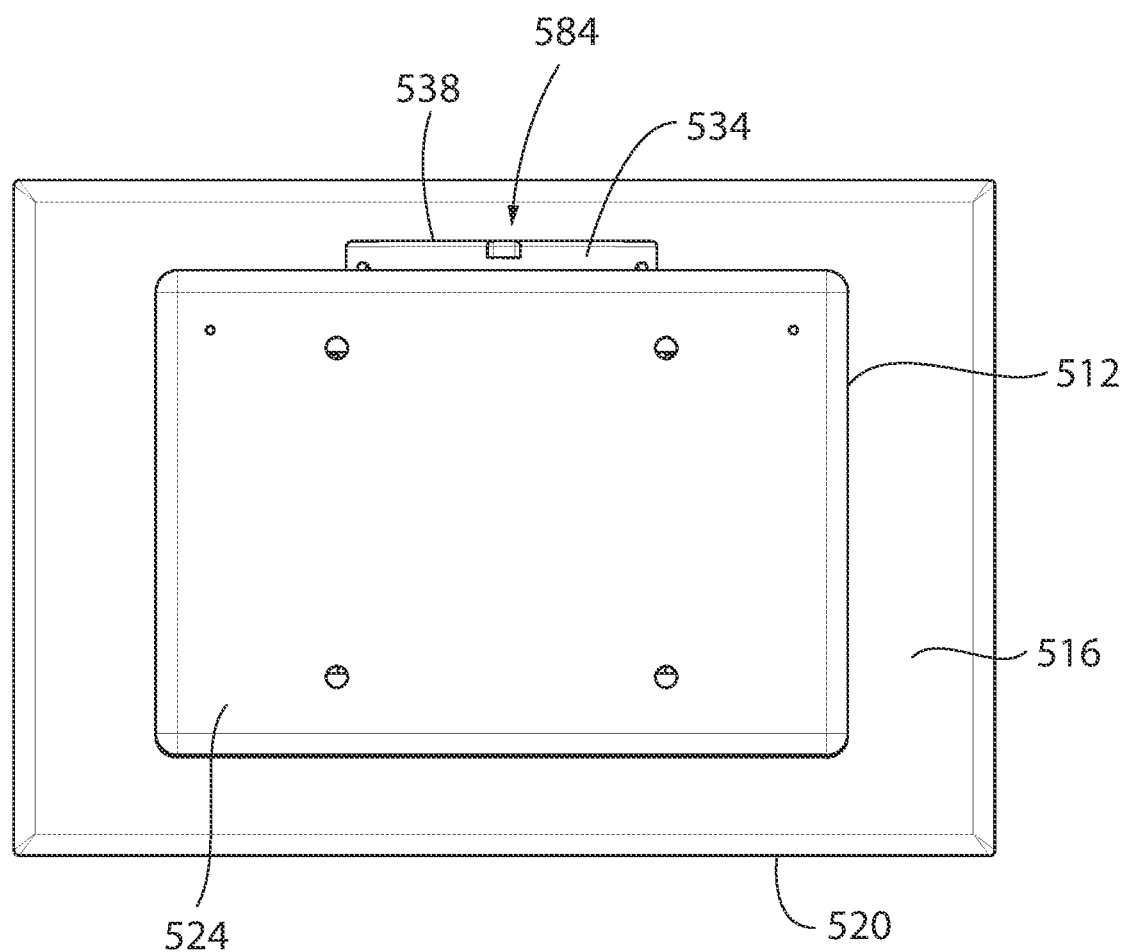
FIG. 25 is a bottom view of the carpenter bee trap of FIG. 20.

Next, FIGS. 23 and 24 are cross-sectional views of the trap 510 to better depict the cavity 514, the container 534 within the cavity 514, and a funnel 564 disposed within the cavity 514. As shown, the funnel 564 is suspended within the cavity 514 and separates the cavity 514 into an upper cavity 514a and a lower cavity 514b.

The container 534 is similar to the container 134 shown in FIGS. 5-9. The container 534 includes a main body 548, a bottom wall 538 disposed at a first end 540 of the main body 548, and a flanged portion 550 extending from a second end 552 of the main body 548. In the representative embodiment of the invention, the container 534 and its walls thicken to increase the outer diameter of the container 534. As a result, the flanged portion 550 has a larger diameter 556 than a diameter 560 of the main body 548 of the container 534.

The diameter 556 of the flanged portion 550 is also larger than a diameter 562 of the exit opening 528 formed in the sidewall 512 of the trap 510. As a result, the container 534 is able to maintain its position having the flanged portion 550 disposed in the cavity 514, the main body 548 disposed through the exit opening 528, and the main body 548 extending beyond and away from the sidewall 512 of the trap 510 without the assistance of a coupling means.

In varying embodiments of the trap 510, the bottom wall 538 may include a plurality of perforations 584 that allow airflow between the inside of the container 534 and the external environment. One benefit of allowing airflow, is that the scent and sound associated with the carpenter bees within the container can act as an attractant for more carpenter bees.

FIG. 23 depicts the interaction between the funnel 564 and an inner surface 570 of the sidewalls 512. The funnel 564 includes a plurality of flanges 568 extending outwardly from the funnel 564. Each flange 568 is oriented to push against the inner surface 570 of a respective sidewall 512 in order to maintain the funnel 564 in a suspended position within the cavity 514. The funnel 564 directs the carpenter bees from the upper cavity 514a to the lower cavity 514b. After entering the lower cavity 514b of the trap 510, the funnel 564 acts to prevent the carpenter bees from escaping the trap 510 until a user removes the container 534.

While FIG. 23 shows the funnel 564 having two (2) flanges 568, it is contemplated that the funnel 564 may include more or less than two (2) flanges 568, in varying embodiments of the invention.

FIG. 23 further depicts the orientation of the entrance openings 532 in the sidewalls 512. In the representative embodiment of the invention, the openings 532 are oriented at an upward angle. However, in other embodiments of the invention, the openings 532 may be oriented at any angle, including upward, downward, and horizontal.

Referring again to FIGS. 20-22, the trap 510 may include a mounting element 572 coupled to a top surface 574 of the top wall 516. While the representative embodiment of the invention illustrates the mounting element 572 as a mounting hook screwed into the top wall 516 of the trap 510, it is also contemplated that the mounting element 572 may be other mounting means coupled to the top wall 516 of the trap 510. A chain or rope 576 may be then be attached to the mounting element 572 in order to suspend the trap 510 from a mounting location, such as, but not limited to, the rafters or eaves of a wooden structure.

Referring next to FIGS. 26-31, perspective, side, cross-sectional, and bottoms views of a trap 610 are shown, according to another embodiment of the invention. The trap 610 includes a cavity 614 surrounded by a plurality of sidewalls 612. While the representative embodiment of the invention illustrates the use of four (4) sidewalls 612, it is contemplated that the trap 610 may have more or less than four (4) sidewalls 612, in varying embodiment of the invention. Further, while the trap 610 is illustrated as being rectangular in shape, different embodiments of the trap 610 may have other shapes.

Figure 26:
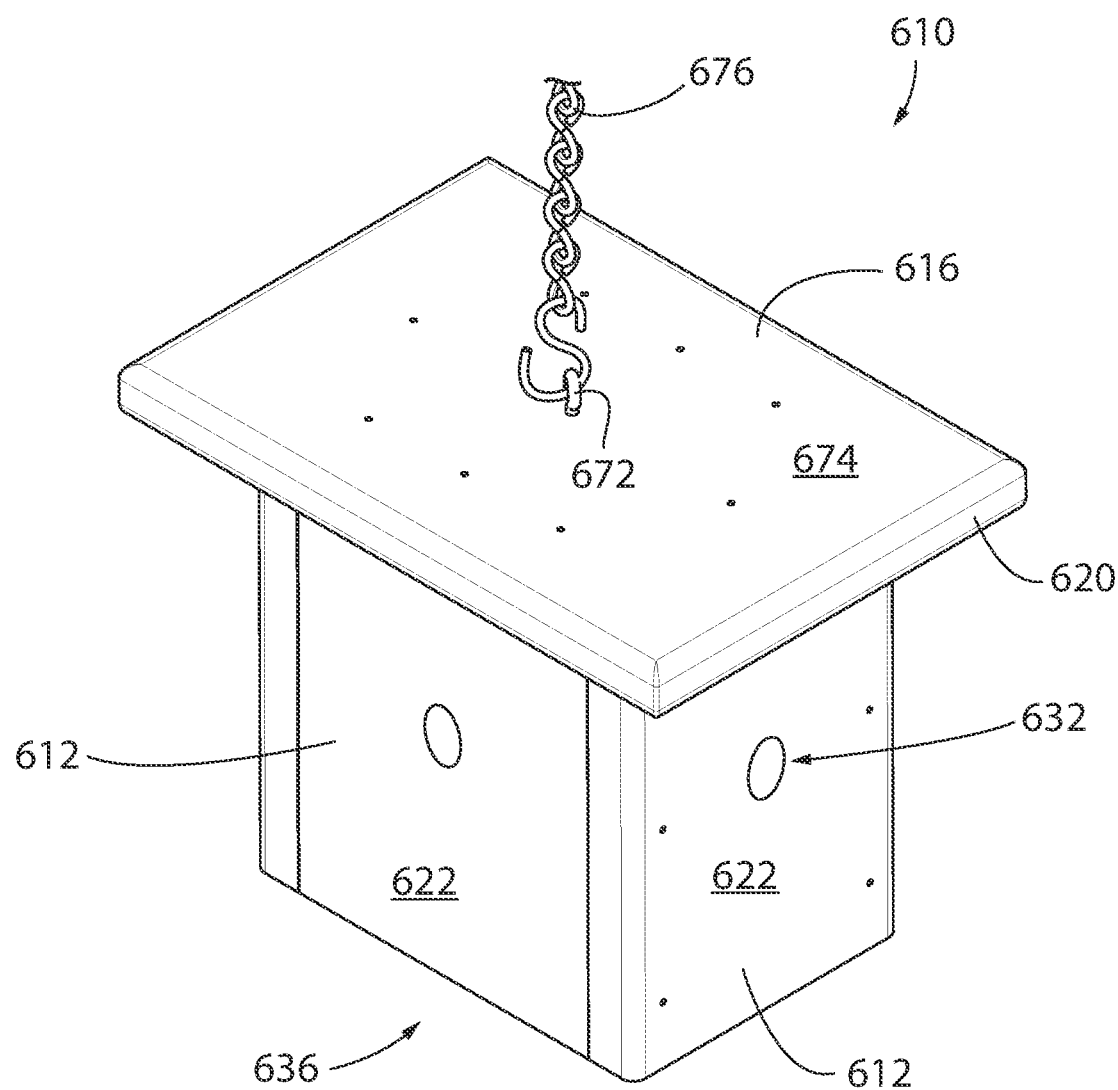
FIG. 26 is a perspective view of a carpenter bee trap, according to an embodiment of the invention.

The trap 610 may also include a top wall 616 attached to the top 618 of the plurality of walls 612 to further enclose the cavity 614. While FIG. 26 depicts the edges 620 of the top wall 616 extending beyond the plurality of sidewalls 612, each edge 620 of the top wall 616 may independently align with the outer surface 622 of a respective sidewall 612 or extend beyond the respective sidewall 612, in alternative embodiments of the invention.

In the representative embodiment of the invention, the bottom 626 of the plurality of walls 612 surround an opening 628 at the bottom 636 of the trap 610. The opening 628 acts as an exit of the trap cavity 614.

Further, at least one opening 632 may be formed through at least one sidewall 512 to act as an entrance to the trap 610. It is contemplated that the carpenter bees will enter the trap 610 through these openings 632. While the representative embodiment of the invention depicts an opening 632 in each sidewall 612, it is contemplated that any number of openings 632 may be formed through any number of sidewalls 612. For example, each sidewall 612 may individually include any number of openings 632 ranging from zero (0) to n number of openings 632. The orientation of the openings 632 will be further described below with respect to FIGS. 28 and 30.

In the representative embodiment of the invention, the sidewalls 612 are depicted as being oriented perpendicular to both the top wall 616 and the bottom wall 624. However, the sidewalls 612 may be independently oriented at any angle with respect to the top wall 616 and the bottom wall 624, in other embodiments of the invention.

Figure 27:
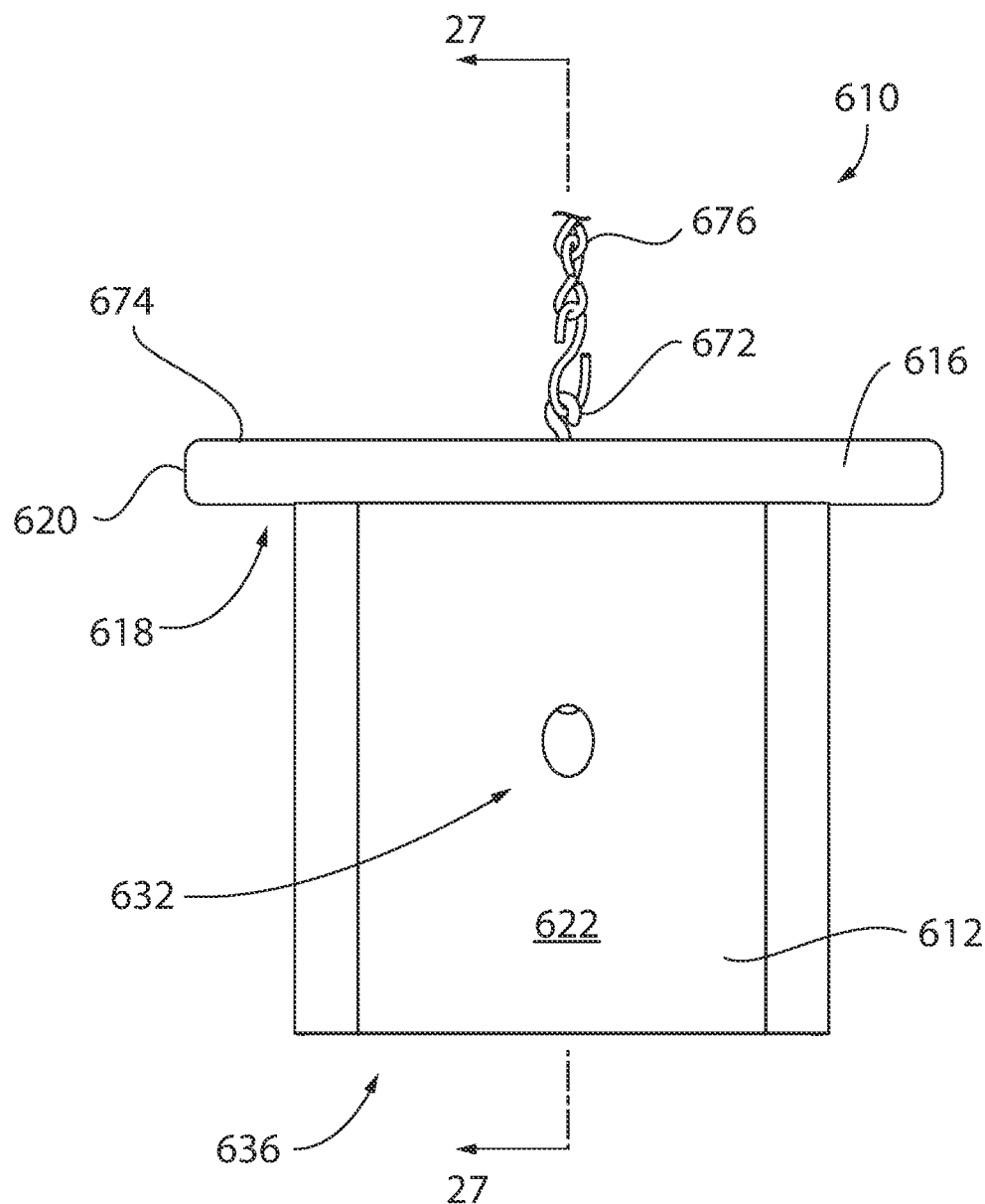
FIG. 27 is a side view of the carpenter bee trap of FIG. 26 with a container in a raised position.
Figure 29:
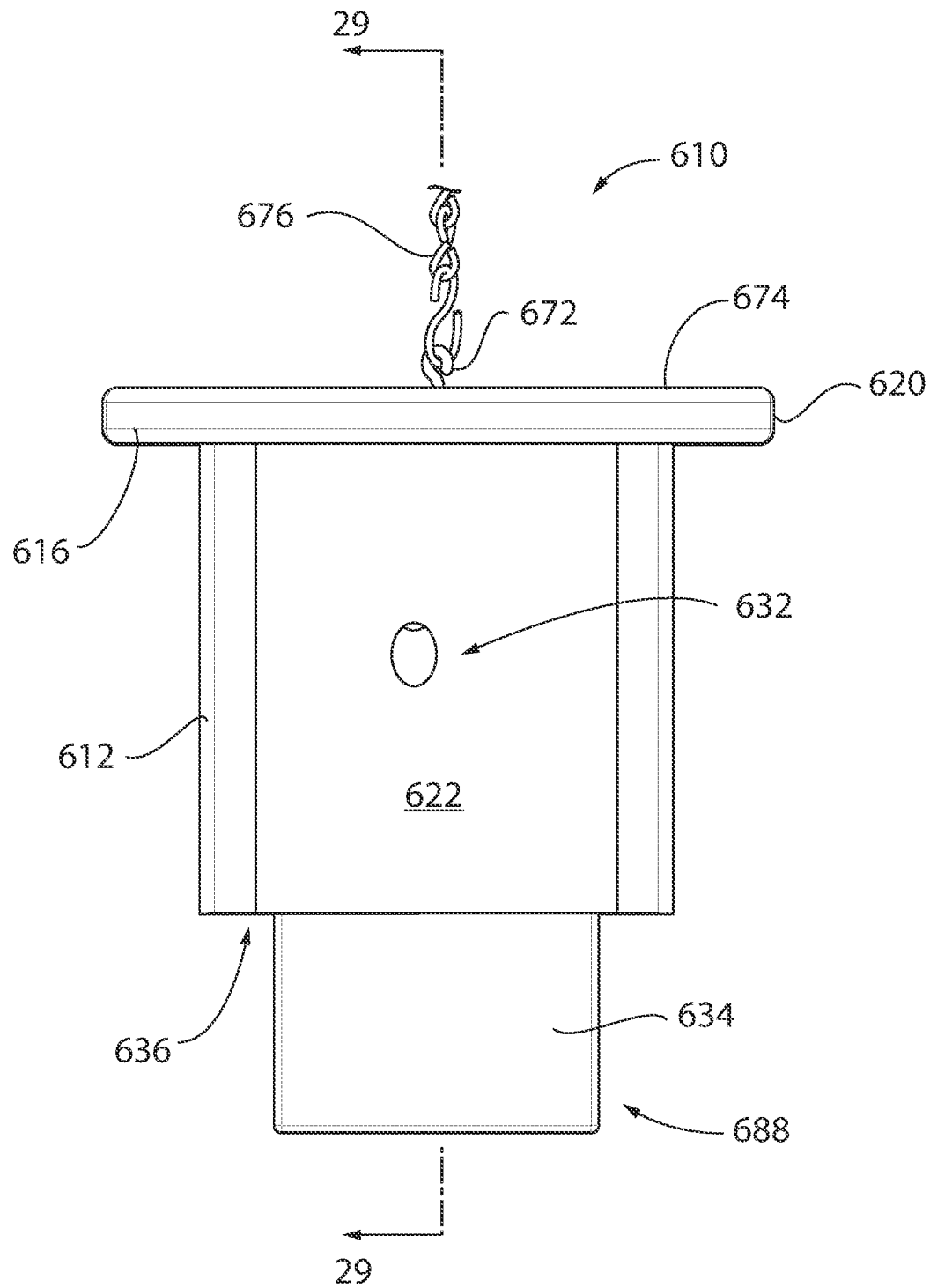
FIG. 29 is a side view of the carpenter bee trap of FIG. 26 with the container in a lowered position.

The trap 610 also includes a container 634 disposed at least partially within the cavity 614 of the trap 610 and extending into the exit opening 628 of the trap 610. FIG. 27 depicts the container 634 in a retracted position 686. FIG. 29 depicts the container 634 in an extended position 688. It is contemplated that the trap 610 may be placed in the retracted position 686 of FIG. 27, the extended position 688 of FIG. 29, or any position in between by a user's manipulation of the container 634, which will be described in further detail later.

Figure 28:
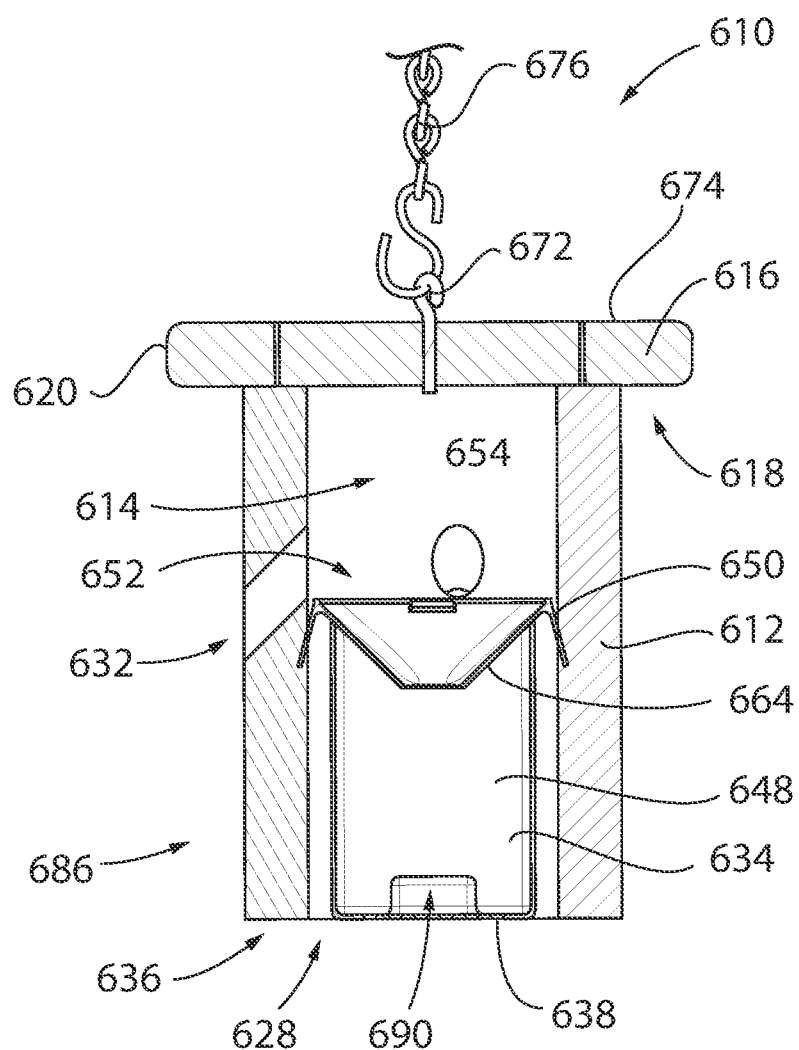
FIG. 28 is a cross-sectional view of the carpenter bee trap of FIG. 27, taken along line 27-27.
Figure 30:
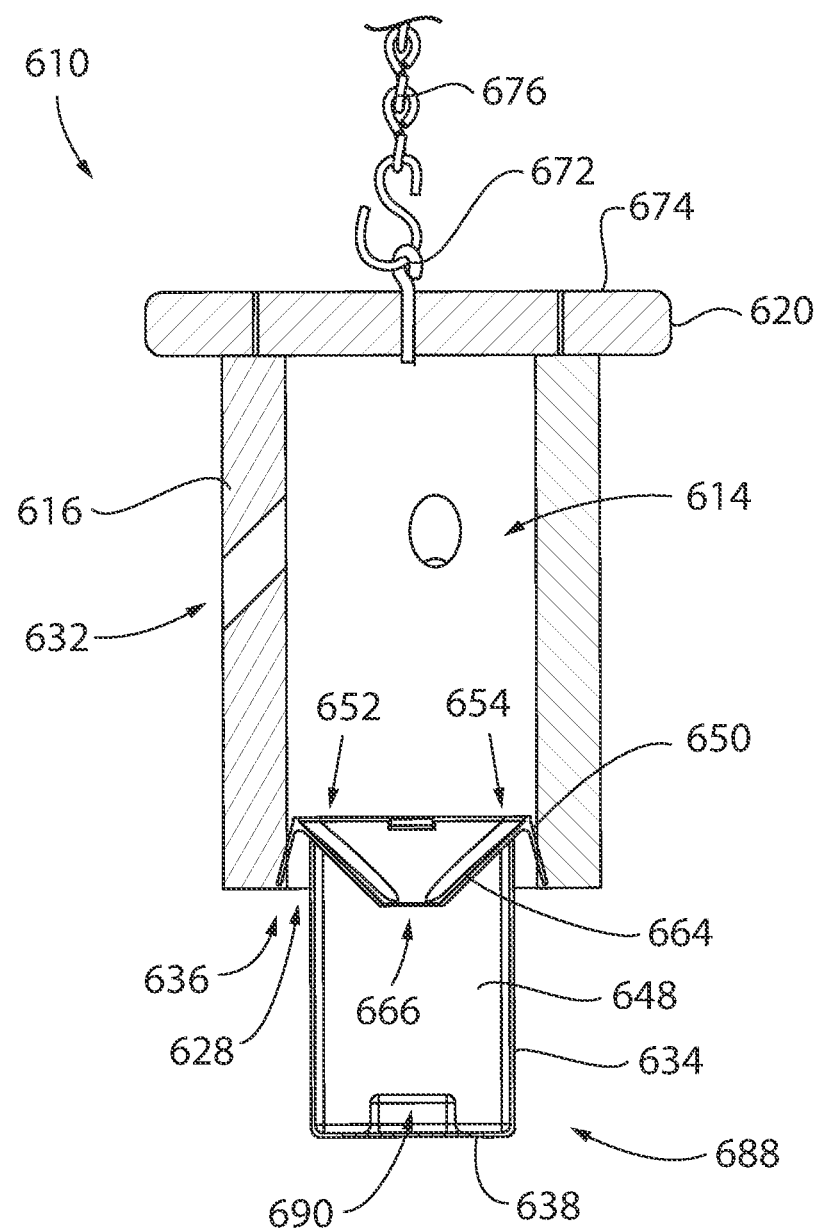
FIG. 30 is a cross-sectional view of the carpenter bee trap of FIG. 29, taken along line 30-30.

FIGS. 28 and 30 illustrate cross-sectional views of FIGS. 27 and 29, respectively, to further show the cavity 614 and the container 634 within the cavity 614. Once again, FIG. 28 depicts the container 634 in the retracted position 686, while FIG. 30 depicts the container 634 in the extended position 688. In the representative embodiment of the invention, the container 634 includes a main body 648 that mirrors the shape of the cavity 614 of the trap 610. In other embodiments of the invention, the main body 648 may be any shape. The container 634 also includes a bottom wall 638 disposed at the bottom 640 of the container 634. In the retracted position 686 of FIG. 28, the main body 648 is disposed within the cavity 614 and extends into the opening 628. In the extended position 688 of FIG. 30, the main body 648 extends through the opening 628 and into the external environment.

The container 634 may include a flanged portion 650 extending outwardly from the top 652 of the main body 648 of the container 634. The flanged portion 650 is oriented to push against the inner surface 670 of a respective sidewall 612 in order to suspend the container 634 in the retracted position 686, the extended position 688, or in position therebetween. The flanged portion 650 allows the container 634 to be suspended without the assistance of other coupling means. While FIGS. 28 and 30 depict the flanged portion 650 as having two (2) flanges, it is contemplated that the flanged portion 650 may include more or less than two (2) flanges, in other embodiments of the invention.

The container 634 may also include a funnel 664 to direct carpenter bees to the main body 648 of the container 634. The funnel 664 extends from the top 654 of the flanged portion 650 to a container opening 666 disposed within the main body 648 of the container 634. The funnel 664 extends from the top 654 of the flanged portion 650 at an angle between 0 and 90 degrees so as to properly direct the carpenter bees to the main body 648 of the container 634.

FIGS. 28 and 30 also depict the orientation of the entrance openings 632 in the sidewalls 612. The openings 632 may be oriented at an upward angle, as shown in FIGS. 28 and 30. It is also contemplated that the openings 632 may be oriented at any angle, upward, downward, horizontal, or otherwise, in varying embodiments of the invention.

Figure 31:
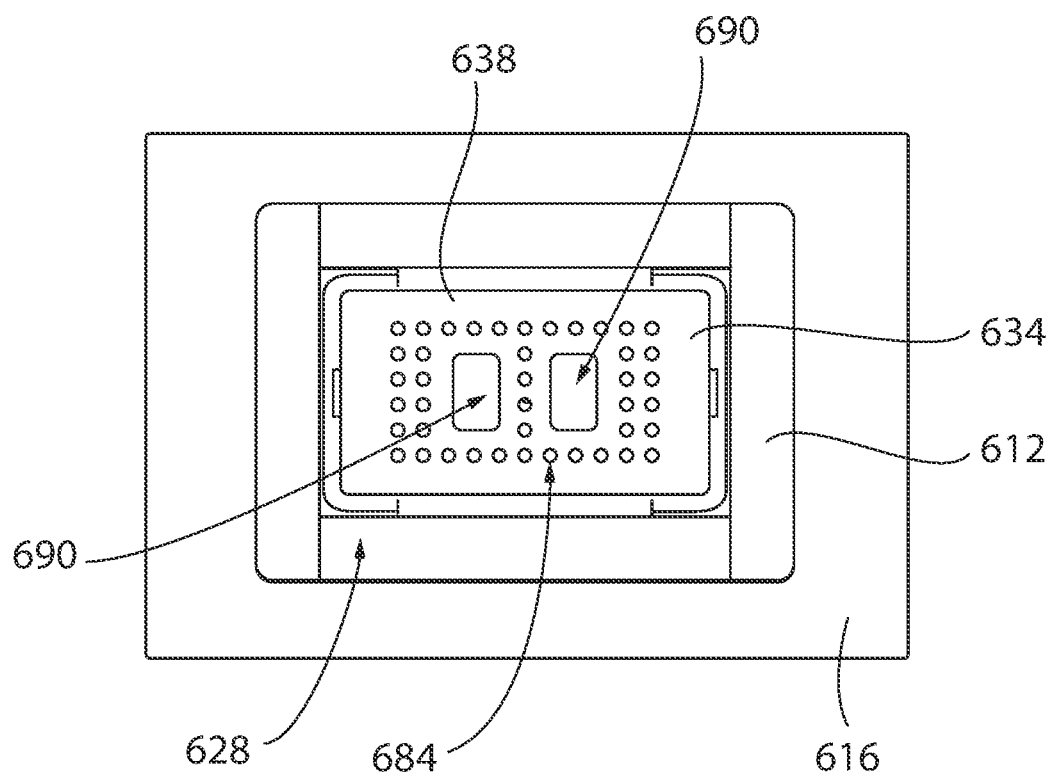
FIG. 31 is a bottom view of the carpenter bee trap of FIG. 26.

Next, FIG. 31 depicts a bottom view of the trap 610. As shown, the bottom wall 638 of the container 634 includes at least one indentation 690 formed in the surface thereof. The at least one indentation 690 is configured to receive a finger of a user or any similar tool in order to allow a user to manipulate the container 634 to any location between and including the retracted position 686 and the extended position 688. Additionally, the user may use the at least one indentation 690 to remove the container 638 entirely from the trap 610 to dispose of the carpenter bees within the trap 610.

In varying embodiments of the trap 610, the bottom wall 638 of the container 634 may include a plurality of perforations 684 to allow airflow between the inside of the container 634 and the external environment. One benefit of allowing airflow, is that the scent and sound associated with the carpenter bees within the container can act as an attractant for more carpenter bees.

It is specifically intended that the present invention not be limited to the embodiments and illustrations contained herein, but includes modified forms of those embodiments including portions of the embodiments and combinations of elements of different embodiments as come within the scope of the following claims.

What is claimed is:

1. A carpenter bee trap comprising:
   a plurality of walls surrounding a trap cavity;
   at least one entrance opening formed through at least one of the plurality of walls;
   a bottom wall coupled to a bottom of the plurality of walls;
   an exit opening formed through one of the walls or the bottom wall;
   a container disposed within the trap cavity and extending through the exit opening and into the external environment; and
   a funnel disposed within the cavity to direct carpenter bees into the container.

2. The carpenter bee trap of claim 1 further comprising a door rotatably connected to the bottom of the container by way of a hinge, the door being operable between a closed position and an open position.

3. The carpenter bee trap of claim 2 wherein the hinge includes a biasing element to bias the door to a closed position.

4. The carpenter bee trap of claim 2 wherein the door includes a plurality of perforations to allow airflow between the container and an external environment.

5. The carpenter bee trap of claim 1 wherein the container includes a main body and a flanged portion extending upward from a top of the main body at an angle between 0 and 90 degrees.

6. The carpenter bee trap of claim 5 wherein the flanged portion has an increasing diameter as it extends from the top of the main body;
   wherein the flanged portion is disposed with the cavity; and
   wherein the main body is disposed within the exit opening and extends away from and beyond the bottom of the trap.

7. The carpenter bee trap of claim 5 wherein the funnel extends from a top of the flanged portion to an opening aligned with the top of the main body.

8. The carpenter bee trap of claim 1 wherein the funnel includes flanges configured to push against an inner surface of at least one sidewall to suspend the funnel within the cavity.

9. A carpenter bee trap comprising:
a plurality of walls surrounding a trap cavity;
at least one entrance opening formed through at least one of the plurality of walls;
an exit opening formed at a bottom of the trap; and
a container disposed within the trap cavity and transitionable between a retracted position and an extended position.

10. The trap of claim 9 wherein the retracted position disposes the container within the trap cavity and into the opening; and
wherein the extended position disposes the container within the trap cavity and extending through the exit opening and beyond the bottom of the trap.

11. The carpenter bee trap of claim 9 wherein the flanged portion extends from a top of a main portion of the container and is configured to push against an inner surface of at least one sidewall to suspend the container within the cavity in one of the retracted position, the extended position, and any position therebetween.

12. The carpenter bee trap of claim 11 wherein the flanged portion includes a funnel extending from a top of the flanged portion to an opening of the container.

13. The carpenter bee trap of claim 9 wherein the container includes a bottom wall and at least one indentation formed in a surface of the bottom wall, wherein the at least one indentation is configured to allow a user to position the container at a location between and including the retracted position and the extended position.

14. The carpenter bee trap of claim 13 wherein the indentation is configured to allow a user to remove the container from the cavity.

15. The carpenter bee trap of claim 13 wherein the bottom wall includes a plurality of perforations formed therethrough to allow airflow between the container and an external environment.

16. A carpenter bee trap comprising:
a plurality of sidewalls surrounding a trap cavity;
at least one entrance opening formed through at least one of the plurality of sidewalls;
a bottom wall coupled to the bottom of the plurality of sidewalls;
an exit opening formed through one of the sidewalls or the bottom wall;
a funnel suspended within the trap cavity, the funnel separating the trap cavity into an upper trap cavity and a lower trap cavity; and
a container disposed within the lower trap cavity and extending through the exit opening and away from the bottom wall of the carpenter bee trap.

17. The carpenter bee trap of claim 16 wherein the container includes a main body, a flanged portion extending from a top of the main body, and a bottom wall coupled to a bottom of the main body; and
wherein the flanged portion is disposed within the lower trap cavity and the main body extends through the exit opening and beyond the bottom wall of the carpenter bee trap.

18. The carpenter bee trap of claim 17 wherein the flanged portion has a first outer diameter and the main body has a second outer diameter; and
wherein the first outer diameter is greater than the second outer diameter.

19. The carpenter bee trap of claim 18 wherein the first outer diameter of the flanged portion is greater than a diameter of the exit opening.

20. The carpenter bee trap of claim 16 wherein the funnel includes at least one flange configured to push against an inner surface of at least one sidewall to suspend the funnel within the cavity.

* * * * *